United States Patent
Lee et al.

(10) Patent No.: US 10,356,386 B2
(45) Date of Patent: *Jul. 16, 2019

(54) METHOD AND APPARATUS FOR PROCESSING PROJECTION-BASED FRAME WITH AT LEAST ONE PROJECTION FACE GENERATED USING NON-UNIFORM MAPPING

(71) Applicant: MEDIATEK INC., Hsin-Chu (TW)

(72) Inventors: Ya-Hsuan Lee, Hsinchu (TW); Peng Wang, Beijing (CN); Jian-Liang Lin, Hsinchu (TW); Shen-Kai Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/766,829

(22) PCT Filed: Apr. 3, 2018

(86) PCT No.: PCT/CN2018/081723
§ 371 (c)(1),
(2) Date: Apr. 9, 2018

(87) PCT Pub. No.: WO2018/184528
PCT Pub. Date: Oct. 11, 2018

(65) Prior Publication Data
US 2018/0359459 A1    Dec. 13, 2018

Related U.S. Application Data

(60) Provisional application No. 62/481,714, filed on Apr. 5, 2017.

(51) Int. Cl.
*H04N 13/161* (2018.01)
*G06T 3/00* (2006.01)
*H04N 13/111* (2018.01)

(52) U.S. Cl.
CPC ........... *H04N 13/161* (2018.05); *G06T 3/005* (2013.01); *H04N 13/111* (2018.05)

(58) Field of Classification Search
CPC .................................................. H04N 13/161
(Continued)

(56) References Cited

U.S. PATENT DOCUMENTS

| 8,786,675 B2 | 7/2014 | Deering |
| 2009/0123088 A1 | 5/2009 | Kallay |

(Continued)

FOREIGN PATENT DOCUMENTS

| CN | 101002474 A | 7/2007 |
| CN | 104219584 A | 12/2014 |

(Continued)

OTHER PUBLICATIONS

"International Search Report" dated Jun. 22, 2018 for International application No. PCT/CN2018/081723, International filing date:Apr. 3, 2018.

(Continued)

*Primary Examiner* — Nguyen T Truong
(74) *Attorney, Agent, or Firm* — Winston Hsu

(57) ABSTRACT

A video processing method includes obtaining projection face(s) from an omnidirectional content of a sphere, and obtaining a re-sampled projection face by re-sampling at least a portion of a projection face of the projection face(s) through non-uniform mapping. The omnidirectional content of the sphere is mapped onto the projection face(s) via a 360-degree Virtual Reality (360 VR) projection. The projection face has a first source region and a second source region. The re-sampled projection face has a first re-sampled region and a second re-sampled region. The first re-sampled region is derived from re-sampling the first source region with a first sampling density. The second re-sampled region (Continued)

is derived from re-sampling the second source region with a second sampling density that is different from the first sampling density.

22 Claims, 20 Drawing Sheets

(58) Field of Classification Search
USPC .......................................................... 348/36
See application file for complete search history.

(56) References Cited

U.S. PATENT DOCUMENTS

| | | |
|---|---|---|
| 2014/0152655 A1 | 6/2014 | Johnston |
| 2016/0088282 A1 | 3/2016 | Sadi |
| 2016/0352791 A1 | 12/2016 | Adams |
| 2016/0353146 A1 | 12/2016 | Weaver |
| 2017/0045941 A1 | 2/2017 | Tokubo |
| 2018/0262775 A1 | 9/2018 | Lee |

FOREIGN PATENT DOCUMENTS

| | | |
|---|---|---|
| CN | 105898254 A | 8/2016 |
| CN | 105915907 A | 8/2016 |
| CN | 205545713 U | 8/2016 |
| CN | 106056531 A | 10/2016 |
| CN | 106162139 A | 11/2016 |
| CN | 205721064 U | 11/2016 |
| CN | 106686381 A | 5/2017 |
| CN | 106846245 A | 6/2017 |
| CN | 107622474 A | 1/2018 |
| JP | 2000-67227 A | 3/2000 |
| JP | 2007-257100 A | 10/2007 |
| WO | 2004/047426 A2 | 6/2004 |
| WO | 2016/140082 A1 | 9/2016 |
| WO | 2016/171404 A1 | 10/2016 |

OTHER PUBLICATIONS

"International Search Report" dated May 31, 2018 for International application No. PCT/CN2018/078785, International filing date:Mar. 13, 2018.

Jian-Liang Lin et al., Title: Method for Processing Projection-Based Frame that Includes at Least One Projection Face Packed in 360-Degree Virtual Reality Projection Layout, pending U.S. Appl. No. 16/143,410, filed Sep. 26, 2018.

"International Search Report" dated Nov. 16, 2018 for International application No. PCT/CN2018/100933, International filing date:Aug. 17, 2018.

"International Search Report" dated Dec. 28, 2018 for International application No. PCT/CN2018/107351, International filing date:Sep. 25, 2018.

METHOD AND APPARATUS FOR PROCESSING PROJECTION-BASED FRAME WITH AT LEAST ONE PROJECTION FACE GENERATED USING NON-UNIFORM MAPPING

CROSS REFERENCE TO RELATED APPLICATIONS

This application claims priority under 35 U.S.C. § 119 from U.S. Provisional Application No. 62/481,714, filed on Apr. 5, 2017, the subject matters of which are incorporated herein by reference.

TECHNICAL FIELD

The present invention relates to processing omnidirectional image/video contents, and more particularly, to a method and an apparatus for processing a projection-based frame with at least one projection face that is generated using non-uniform mapping.

BACKGROUND

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image/video content corresponding to a sphere. With advances in camera rigs and HMDs, the delivery of VR content may soon become the bottleneck due to the high bitrate required for representing such a 360-degree image/video content. When the resolution of the omnidirectional video is 4K or higher, data compression/encoding is critical to bitrate reduction.

In general, the omnidirectional image/video content corresponding to the sphere is transformed into a sequence of images, each of which is a projection-based frame with a 360-degree image/video content represented by one or more projection faces arranged in a 360-degree Virtual Reality (360 VR) projection layout, and then the sequence of the projection-based frames is encoded into a bitstream for transmission. If the omnidirectional image/video content is not properly projected onto projection face(s) packed in the 360 VR projection layout, the image quality after compression and/or the coding efficiency may be poor.

SUMMARY

One of the objectives of the claimed invention is to provide a method and an apparatus for processing a projection-based frame with at least one projection face that is generated using non-uniform mapping.

According to a first aspect of the present invention, an exemplary video processing method is disclosed. The exemplary video processing method includes: obtaining at least one projection face from an omnidirectional content of a sphere, wherein the omnidirectional content of the sphere is mapped onto said at least one projection face via a 360-degree Virtual Reality (360 VR) projection, and said at least one projection face comprises a first projection face; obtaining, by a re-sampling circuit, a first re-sampled projection face by re-sampling at least a portion of the first projection face through non-uniform mapping, wherein the first projection face has a first source region and a second source region, the first re-sampled projection face has a first re-sampled region and a second re-sampled region, the first re-sampled region is derived from re-sampling the first source region with a first sampling density, and the second re-sampled region is derived from re-sampling the second source region with a second sampling density that is different from the first sampling density; generating a projection-based frame according to a projection layout of the 360 VR projection, wherein the projection-based frame comprises the first re-sampled projection face packed in the projection layout; and encoding the projection-based frame to generate a part of a bitstream.

According to a second aspect of the present invention, an exemplary video processing method is disclosed. The exemplary video processing method includes: receiving a part of a bitstream; decoding the part of the bitstream to generate a projection-based frame, wherein the projection-based frame has a 360-degree content represented by at least one projection face packed in a projection layout of a 360-degree Virtual Reality (360 VR) projection, and said at least one projection face comprises a first projection face with at least a portion created by encoder-side non-uniform mapping; and obtaining, by a re-sampling circuit, a first re-sampled projection face by re-sampling said at least a portion of the first projection face through an inverse of the encoder-side non-uniform mapping, wherein the first projection face has a first source region and a second source region, the first re-sampled projection face has a first re-sampled region and a second re-sampled region, the first re-sampled region is derived from re-sampling the first source region with a first sampling density, and the second re-sampled region is derived from re-sampling the second source region with a second sampling density that is different from the first sampling density.

In addition, video processing apparatuses associated with the above video processing methods are provided.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
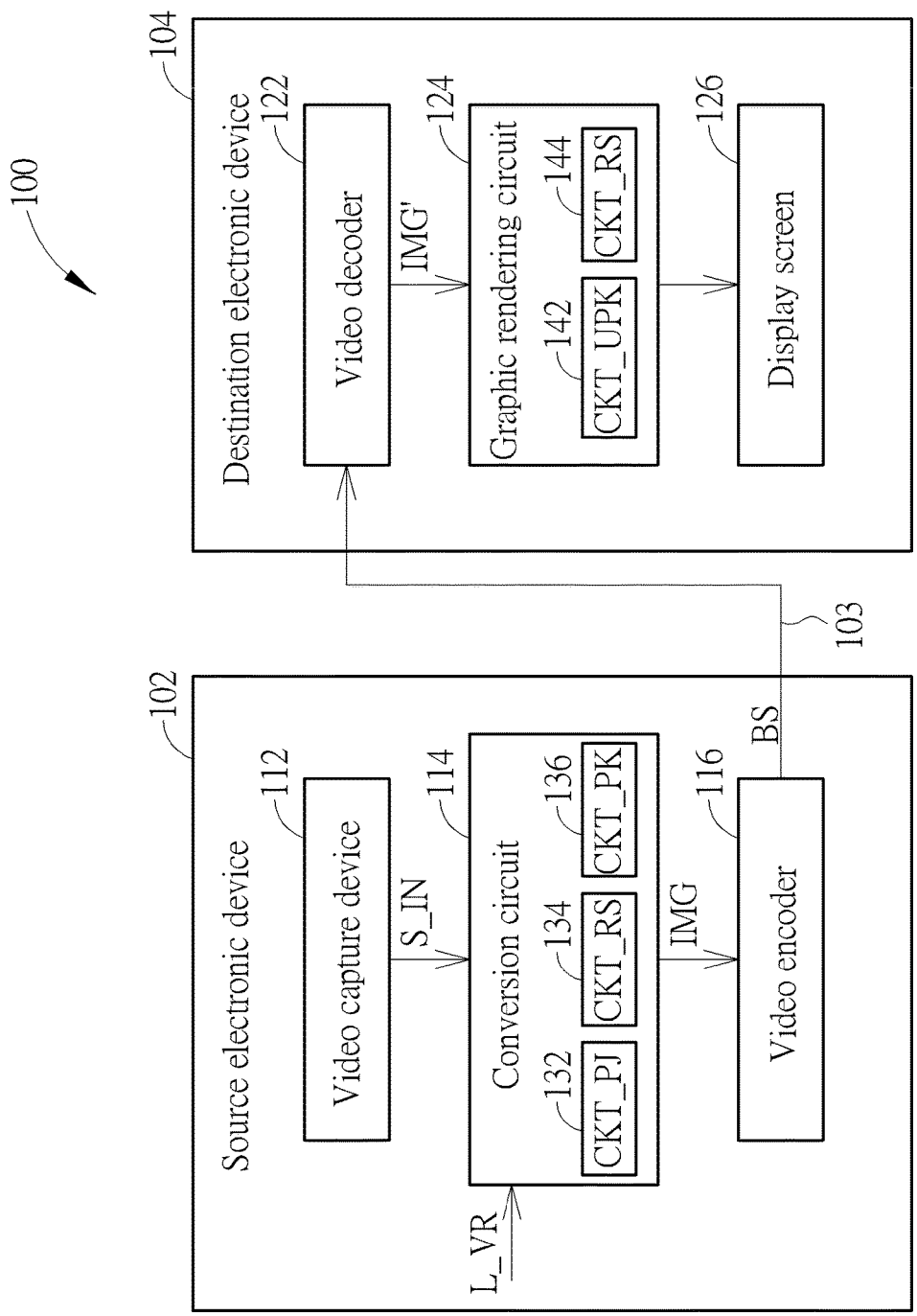
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. The conversion circuit 114 may be implemented using a plurality of circuit blocks, such as a projection circuit (denoted by "CKT_PJ") 132, a re-sampling circuit (denoted by "CKT_RS") 134, a packing circuit (denoted by "CKT_PK") 136, and other circuit(s) (not shown). For example, the video capture device 112 may be a set of cameras used to provide an omnidirectional image/video content (e.g., multiple images that cover the whole surroundings) S_IN corresponding to a sphere. The conversion circuit 114 is coupled between the video capture device 112 and the video encoder 116. The conversion circuit 114 generates a projection-based frame IMG according to a projection layout L_VR of the 360 VR projection format and the omnidirectional image/video content S_IN. The projection-based frame IMG may be one frame included in a sequence of projection-based frames generated from the conversion circuit 114. The video encoder 116 is an encoding circuit used to encode/compress the projection-based frames IMG to generate a part of a bitstream BS. Further, the video encoder 116 outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display screen 126. The graphic rendering circuit 124 may be implemented using a plurality of circuit blocks, such as an unpacking circuit (denoted by "CKT_UPK") 142, a re-sampling circuit (denoted by "CKT_RS") 144, and other circuit(s) (not shown). The video decoder 122 receives the bitstream BS from the transmission means 103 (e.g., wired/wireless communication link or storage medium), and decodes a part of the received bitstream BS to generate a decoded projection-based frame IMG'. For example, the video decoder 122 generates a sequence of decoded frames by decoding the received bitstream BS, where the decoded projection-based frame IMG' is one frame included in the sequence of decoded frames. In this embodiment, the projection-based frame IMG to be encoded by the video encoder 116 at the encoder side (i.e., source electronic device 102) has a projection layout of a 360 VR projection format. Hence, after the bitstream BS is decoded by the decoding circuit 122 at the decoder side (i.e., destination electronic device 104), the decoded projection-based frame IMG' has the same 360 VR projection format and the same projection layout. The graphic rendering circuit 124 is coupled between the video decoder 124 and the display screen 126. The graphic rendering circuit 124 renders and displays an output image data on the display screen 126 according to the decoded projection-based frame IMG'. For example, a viewport area associated with a portion of the 360-degree image/video content carried by the decoded projection-based frame IMG' may be displayed on the display screen 126 via the graphic rendering circuit 124.

In this embodiment, the conversion circuit 114 supports a proposed encoder-side projection face re-sampling function, and the graphic rendering circuit 124 supports a proposed decoder-side projection face re-sampling function, where the decoder-side projection face re-sampling function is an inverse of the encoder-side projection face re-sampling function. For example, the encoder-side projection face re-sampling function may apply down-sampling to a projection face before encoding, and the decoder-side projection face re-sampling function may apply up-sampling to a projection face after decoding. For another example, the encoder-side projection face re-sampling function may apply up-sampling to a projection face before encoding, and the decoder-side projection face re-sampling function may apply down-sampling to a projection face after decoding. For yet another example, the encoder-side projection face re-sampling function may apply re-sampling with no size change to a projection face before encoding, and the decoder-side projection face re-sampling function may apply inverse re-sampling with no size change to a projection face after decoding.

Specifically, regarding the encoder side (i.e., source electronic device 102), the projection circuit 132 is arranged to obtain projection face(s) from an omnidirectional image/video content of a sphere, wherein the omnidirectional image/video content of the sphere is mapped onto the projection face(s) via a 360 VR projection. The re-sampling circuit 134 is arranged to obtain a re-sampled projection face by re-sampling at least a portion (i.e., part or all) of a projection face of the projection face(s) through non-uniform mapping. The packing circuit 136 is arranged to generate the projection-based frame IMG according to the projection layout L_VR of the 360 VR projection, wherein the projection-based frame IMG has the re-sampled projection face packed in the projection layout L_VR. In addition to a re-sampling function with non-uniform mapping, the re-sampling circuit 134 may also support a re-sampling function with uniform mapping. Further details of uniform mapping and non-uniform mapping are described as below.

Figure 2:
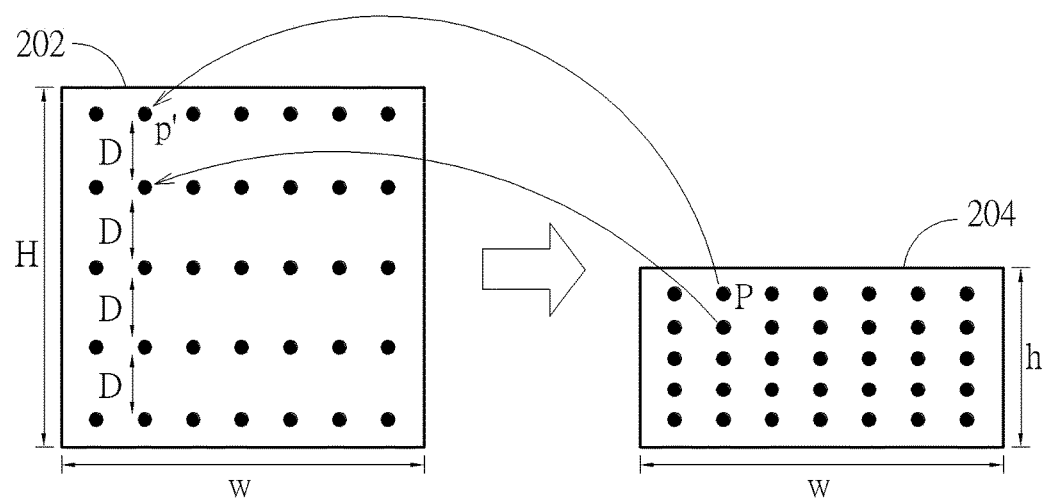
FIG. 2 is a diagram illustrating an example of re-sampling a projection face through uniform mapping.
Figure 3:
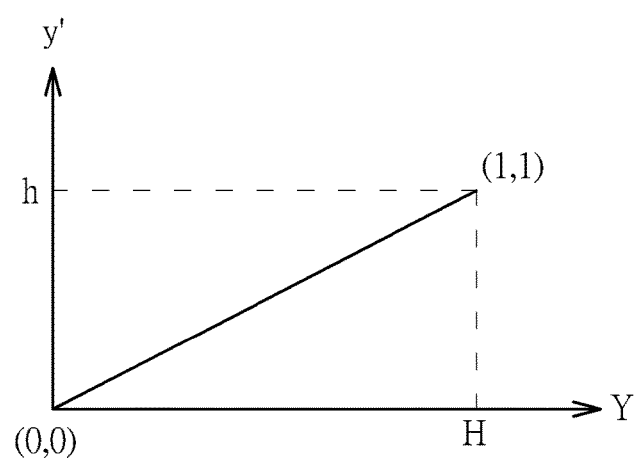
FIG. 3 is a diagram illustrating a curve of a uniform mapping function according to an embodiment of the present invention.

Please refer to FIG. 2 in conjunction with FIG. 3. FIG. 2 is a diagram illustrating an example of re-sampling a projection face through uniform mapping. FIG. 3 is a diagram illustrating a curve of a uniform mapping function according to an embodiment of the present invention. In this example, a rectangular projection face 204 is derived from down-sampling a square projection face (which is also a rectangular projection face) 202 in its height direction, where the square projection face 202 has width w and height H (H=w), and the rectangular projection face 204 has width w and height h (h<H). That is, down-sampling from height H to height h with the same width w is performed by uniform mapping for a square. By way of example, but not limitation, the uniform mapping function may be expressed using the following formula.

$$y' = \frac{h}{H} * Y \quad (1)$$

Hence, regarding a pixel position located at a coordinate y' of y-axis in the rectangular projection face 204, a corresponding sampling point located at a coordinate Y of y-axis in the square projection face 202 can be determined from the uniform mapping function expressed in formula (1). The pixel value of a position P in the rectangular projection face 204 is derived from using the pixel value of the corresponding sampling position p' in the square projection face 202. Due to the uniform mapping in the height direction, two vertically adjacent sampling points in the rectangular projection face 202 are uniformly distributed with a constant distance D.

A sampling point (i.e., the obtained pixel position p') in the square projection face 202 may not be at an integer position. If a y-axis coordinate Y of a sampling point in the square projection face 202 is a non-integer position, an interpolation filter (not shown) in the conversion circuit 114 (particularly, re-sampling circuit 134) may be applied to integer pixels around the sampling point in the square projection face 202 to derive the pixel value of the sampling point.

In another case where the rectangular projection face 204 is derived from down-sampling the square projection face 202 in its width direction. The uniform mapping function may be expressed using the following formula.

$$x' = \frac{h}{H} * X \quad (2)$$

In formula (2), H may represent the width of the square projection face 202, and h may represent the width of the rectangular projection face 204. Hence, regarding a pixel position located at a coordinate x' of x-axis in the rectangular projection face 204, a corresponding sampling point located at a coordinate X of x-axis in the square projection face 202 can be determined from the uniform mapping function expressed in formula (2). The pixel value of a position P in the rectangular projection face 204 is derived from using the pixel value of the corresponding sampling position p' in the square projection face 202. Due to the uniform mapping in the width direction, two horizontally adjacent sampling points in the rectangular projection face 202 are uniformly distributed with a constant distance.

A sampling point (i.e., the obtained pixel position p') in the square projection face 202 may not be at an integer position. If an x-axis coordinate X of a sampling point in the square projection face 202 is a non-integer position, an interpolation filter (not shown) in the conversion circuit 114 (particularly, re-sampling circuit 134) may be applied to integer pixels around the sampling point in the square projection face 202 to derive the pixel value of the sampling point.

In yet another case where the rectangular projection face 204 is derived from down-sampling the square projection face 202 in its height direction and width direction. Hence, regarding a pixel position located at a coordinate y' of y-axis in the rectangular projection face 204, a corresponding sampling point located at a coordinate Y of y-axis in the square projection face 202 can be determined from the uniform mapping function expressed in formula (1). In addition, regarding a pixel position located at a coordinate x' of x-axis in the rectangular projection face 204, a corresponding sampling point located at a coordinate X of x-axis in the square projection face 202 can be determined from the uniform mapping function expressed in formula (2). The pixel value of a position P in the rectangular projection face 204 is derived from using the pixel value of the corresponding sampling position p' in the square projection face 202. Due to the uniform mapping in both of the height direction and the width direction, the sampling points in the rectangular projection face 204 are uniformly distributed.

A sampling point (i.e., the obtained pixel position p') in the square projection face 202 may not be at an integer position. If at least one of an x-axis coordinate X and a y-axis coordinate Y of a sampling point in the square projection face 202 is a non-integer position, an interpolation filter (not shown) in the conversion circuit 114 (particularly, re-sampling circuit 134) may be applied to integer pixels around the sampling point in the square projection face 202 to derive the pixel value of the sampling point.

Figure 4:
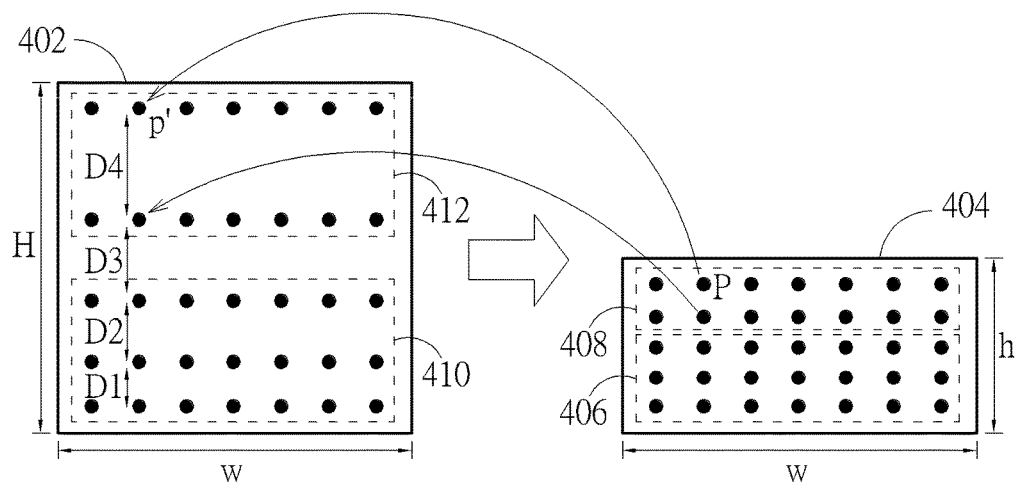
FIG. 4 is a diagram illustrating an example of re-sampling a projection face through non-uniform mapping according to an embodiment of the present invention.
Figure 5:
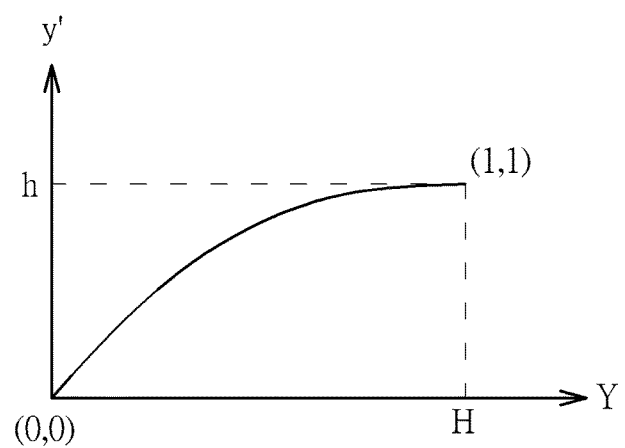
FIG. 5 is a diagram illustrating a curve of a non-uniform mapping function according to an embodiment of the present invention.

To preserve more details for a particular area (e.g., an area near a main view or an area near an equator), the present invention further proposes re-sampling a projection face through non-uniform mapping. Please refer to FIG. 4 in conjunction with FIG. 5. FIG. 4 is a diagram illustrating an example of re-sampling a projection face through non-uniform mapping according to an embodiment of the present invention. FIG. 5 is a diagram illustrating a curve of a non-uniform mapping function according to an embodiment of the present invention. In this example, a rectangular projection face 404 is derived from down-sampling a square projection face (which is also a rectangular projection face) 402 in its height direction, where the square projection face 402 has width w and height H (H=w), and the rectangular projection face 404 has width w and height h (h<H). By way of example, but not limitation, the non-uniform mapping function may be expressed using the following formula.

$$\frac{y'}{h} = 1 - \left(1 - \frac{Y}{H}\right)^n \quad (3)$$

Hence, regarding a pixel position located at a coordinate y' of y-axis in the rectangular projection face 404, a corresponding sampling point located at a coordinate Y of y-axis in the square projection face 402 can be determined from the non-uniform mapping function expressed in formula (3). As shown in FIG. 4, the interval between two vertically adjacent sampling points is not a constant. For example, the interval between two vertically adjacent sampling points may be one of D1, D2, D3 and D4, where D4>D3>D2>D1. Specifically, the sampling points are non-uniformly distributed in the height direction of the square projection face 402. The pixel value of a position P in the rectangular projection face 404 is derived from using the pixel value of the corresponding sampling position p' in the square projection face 402. For example, pixels in a first re-sampled region 406 of the rectangular projection face 404 are obtained by re-sampling a first source region 410 of the square projection face 402, and pixels in a second re-sampled region 408 of the rectangular projection face 404 are obtained by re-sampling the second source region 412 of the square projection face 402. Due to the non-uniform mapping in the height direction, the density of sampling points obtained from the first source region 410 is different from the density of sampling points obtained from the second source region 412. In other words, different sampling rates are used in the height direction of the square projection face 402. The first re-sampled region 406 is derived from re-sampling the first source region 410 with a first sampling rate (or first sampling density), and the second re-sampled region 408 is derived from re-sampling the second source region 412 with a second sampling rate (or second sampling density), wherein the second sampling rate (or second sampling density) is different from the first sampling rate (or first sampling density).

To preserve more details for a particular area (e.g., an area near a main view or an area near an equator), the first sampling density and the second sampling density are properly controlled by the non-uniform mapping. Assuming that the first source region 410 is closer to a center of the user's viewport or closer to an equator, the first sampling rate (or first sampling density) is particularly set to be higher than the second sampling rate (or second sampling density). In this way, most of the pixels in the rectangular projection face 404 are derived from re-sampling the first source region 410 in the square projection face 402.

A sampling point (i.e., the obtained pixel position p') in the square projection face 402 may not be at an integer position. If a y-axis coordinate Y of a sampling point in the square projection face 402 is a non-integer position, an interpolation filter (not shown) in the conversion circuit 114 (particularly, re-sampling circuit 134) may be applied to integer pixels around the sampling point in the square projection face 402 to derive the pixel value of the sampling point.

In another case where the rectangular projection face 404 is derived from down-sampling the square projection face 402 in its width direction. The non-uniform mapping function may be expressed using the following formula.

$$\frac{x'}{h} = 1 - \left(1 - \frac{X}{H}\right)^n \quad (4)$$

In formula (4), H may represent the width of the square projection face 402, and h may represent the width of the rectangular projection face 404. Hence, regarding a pixel position located at a coordinate x' of x-axis in the rectangular projection face 404, a corresponding sampling point located at a coordinate X of x-axis in the square projection face 402 can be determined from the non-uniform mapping function expressed in formula (4). Specifically, the sampling points are non-uniformly distributed in the width direction of the square projection face 402. The pixel value of a position P in the rectangular projection face 404 is derived from using the pixel value of the corresponding sampling position p' in the square projection face 402. Due to the non-uniform mapping in the width direction, a first re-sampled region of the rectangular projection face 404 is derived from re-sampling a first source region of the square projection face 402 with a first sampling rate (or first sampling density), and a second re-sampled region of the rectangular projection face 404 is derived from re-sampling a second source region of the square projection face 402 with a second sampling rate (or second sampling density), wherein the second sampling rate (or second sampling density) is different from the first sampling rate (or first sampling density). For example, when the first source region of the square projection face 402 is closer to a center of the user's viewport (or closer to an equator) than the second source region of the square projection face 402, the first sampling rate (or first sampling density) is particularly set to be higher than the second sampling rate (or second sampling density).

A sampling point (i.e., the obtained pixel position p') in the square projection face 402 may not be at an integer position. If an x-axis coordinate X of a sampling point in the square projection face 402 is a non-integer position, an interpolation filter (not shown) in the conversion circuit 114 (particularly, re-sampling circuit 134) may be applied to integer pixels around the sampling point in the square projection face 402 to derive the pixel value of the sampling point.

In yet another case where the rectangular projection face 404 is derived from down-sampling the square projection face 402 in its height direction and width direction. Hence, regarding a pixel position located at a coordinate y' of y-axis in the rectangular projection face 404, a corresponding sampling point located at a coordinate Y of y-axis in the square projection face 402 can be determined from the non-uniform mapping function expressed in formula (3). In addition, regarding a pixel position located at a coordinate x' of x-axis in the rectangular projection face 404, a corresponding sampling point located at a coordinate X of x-axis in the square projection face 402 can be determined from the non-uniform mapping function expressed in formula (4). Specifically, the sampling points are non-uniformly distributed in the height direction of the square projection face 402, and are also non-uniformly distributed in the width direction of the square projection face 402. The pixel value of a position P in the rectangular projection face 404 is derived from using the pixel value of the corresponding sampling position p' in the square projection face 402. Due to the non-uniform mapping in the height direction and the width direction, a first re-sampled region of the rectangular projection face 404 is derived from re-sampling a first source region of the square projection face 402 with a first sampling rate (or first sampling density), and a second re-sampled region of the rectangular projection face 404 is derived from re-sampling a second source region of the square projection face 402 with a second sampling rate (or second sampling density), where the second sampling rate (or second sampling density) is different from the first sampling rate (or first sampling density). For example, when the first source region of the square projection face 402 is closer to a center of the user's viewport (or closer to an equator) than the second source region of the square projection face 402, the first sampling rate (or first sampling density) is particularly set to be higher than the second sampling rate (or second sampling density).

A sampling point (i.e., the obtained pixel position p') in the square projection face 402 may not be at an integer position. If at least one of an x-axis coordinate X and a y-axis coordinate Y of a corresponding sampling point in the square projection face 402 is a non-integer position, an interpolation filter (not shown) in the conversion circuit 114 (particularly, re-sampling circuit 134) may be applied to integer pixels around the sampling point in the square projection face 402 to derive the pixel value of the sampling point.

Regarding the decoder side (i.e., destination electronic device 104), the video decoder 122 is arranged to receive the bitstream BS, and decode a part of the bitstream BS to generate a decoded projection-based frame IMG', wherein the decoded projection-based frame IMG' has a 360-degree content represented by projection face(s) packed in the same projection layout L_VR of the 360 VR projection, and the projection face(s) include a projection face with at least a portion (i.e., part or all) created by encoder-side non-uniform mapping. The unpacking circuit 142 is arranged to obtain the projection face from the decoded projection-based frame IMG' according to the projection layout L_VR. For example, the projection layout L_VR employed by the source electronic device 102 may be signaled to the destination electronic device 104 via the bitstream BS. The re-sampling circuit 144 is arranged to obtain a re-sampled projection face by re-sampling at least a portion (i.e., part or all) of the projection face through an inverse of the non-uniform mapping. In other words, a projection face that is re-sampled in the encoder side can be recovered at the decoder side through a corresponding inverse mapping function.

In addition to a re-sampling function with inverse non-uniform mapping, the re-sampling circuit 144 may also support a re-sampling function with inverse uniform mapping. The uniform mapping function in FIG. 2 may also be used as an inverse uniform mapping function. Hence, regarding a pixel position in an inverse-resampled face, a corresponding sampling point located in a projection face obtained from the decoded projection-based frame IMG' can be determined from the uniform mapping function expressed in formula (1). A sampling point in the projection face obtained from the decoded projection-based frame IMG' may not be at an integer position. An interpolation filter (not shown) in the graphic rendering circuit 124 (particularly, re-sampling circuit 144) may be applied to integer pixels around the sampling point in the projection face obtained from the decoded projection-based frame IMG' to derive the pixel value of the sampling point.

Figure 6:
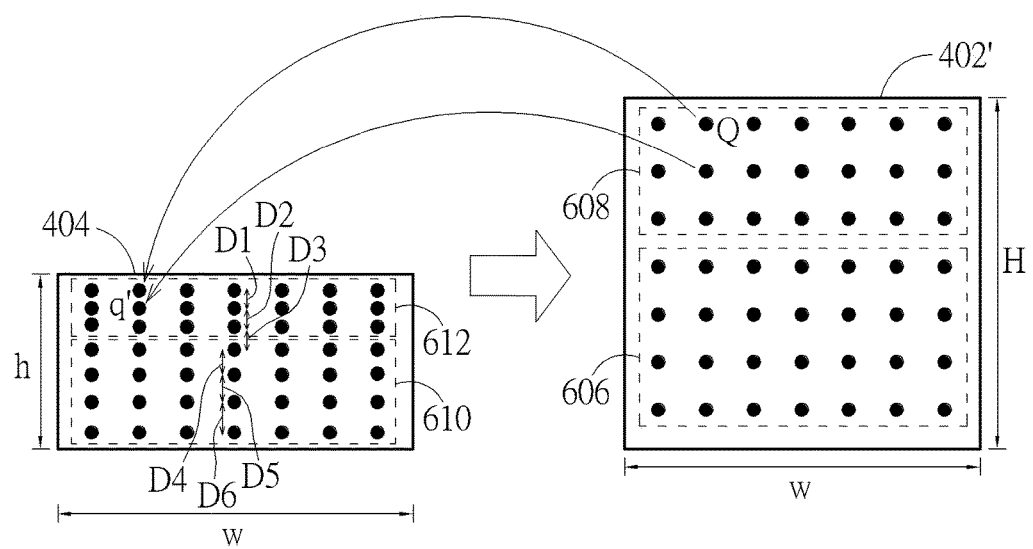
FIG. 6 is a diagram illustrating an example of re-sampling a projection face through inverse non-uniform mapping according to an embodiment of the present invention.
Figure 7:
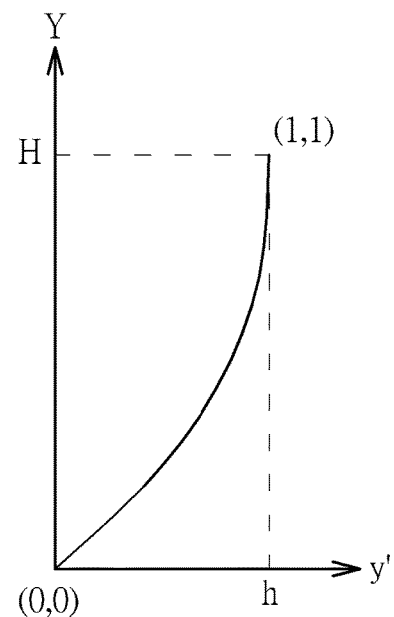
FIG. 7 is a diagram illustrating a curve of an inverse non-uniform mapping function according to an embodiment of the present invention.

Please refer to FIG. 6 in conjunction with FIG. 7. FIG. 6 is a diagram illustrating an example of re-sampling a projection face through inverse non-uniform mapping according to an embodiment of the present invention. FIG. 7 is a diagram illustrating a curve of an inverse non-uniform mapping function according to an embodiment of the present invention. As mentioned above, the rectangular projection face 404 may be derived from down-sampling the square projection face 402 in its height direction and packed in the projection-based frame IMG for encoding at the encoder side (i.e., source electronic device 102). In this example, the rectangular projection face 404 obtained from the decoded projection-based frame IMG' is re-sampled (e.g., up-sampled in its height direction) to recover a square projection face 402' at the decoder side (i.e., destination electronic device 104), where the square projection faces 402 and 402' have the same shape and the same size. As shown in FIG. 6, the square projection face 402' has width w and height H (H=w), and the rectangular projection face 404 has width w and height h (h<H). By way of example, but not limitation, the inverse non-uniform mapping function as shown in FIG. 7 may be an inverse of the non-uniform mapping function expressed in formula (3).

Hence, regarding a pixel position located at a coordinate Y of y-axis in the square projection face 402', a corresponding sampling point located at a coordinate y' of y-axis in the rectangular projection face 404 can be determined from the inverse non-uniform mapping function. As shown in FIG. 6, the interval between two vertically adjacent sampling points is not a constant. For example, the interval between two vertically adjacent sampling points may be one of D1, D2, D3, D4, D5, and D6, where D6>D5>D4>D3>D2>D1. Specifically, the sampling points are non-uniformly distributed in the height direction of the rectangular projection face 404. The pixel value of a position Qin the square projection face 402' is derived from using the pixel value of the corresponding sampling position q' in the rectangular projection face 404. For example, pixels in a first re-sampled region 606 of the square projection face 402' are obtained by re-sampling a first source region 610 of the rectangular projection face 404, and pixels in a second re-sampled region 608 of the square projection face 402' are obtained by re-sampling the second source region 612 of the rectangular projection face 404. Due to the non-uniform mapping in the height direction, the density of sampling points obtained from the first source region 610 is different from the density of sampling points obtained from the second source region 612. In other words, different sampling rates are used in the height direction of the rectangular projection face 404. The first re-sampled region 606 is derived from re-sampling the first source region 610 with a first sampling rate (or first sampling density), and the second re-sampled region 608 is derived from re-sampling the second source region 612 with a second sampling rate (or second sampling density), wherein the second sampling rate (or second sampling density) is different from the first sampling rate (or first sampling density).

A sampling point (i.e., the obtained pixel position q') in the rectangular projection face 404 may not be at an integer position. If a y-axis coordinate y' of a sampling point in the rectangular projection face 404 is a non-integer position, an interpolation filter (not shown) in the graphic rendering circuit 124 (particularly, re-sampling circuit 144) may be applied to integer pixels around the sampling point in the rectangular projection face 404 to derive the pixel value of the sampling point.

In another case where the rectangular projection face 404 is derived from down-sampling the square projection face 402 in its width direction and packed in the projection-based frame IMG for encoding at the encoder side (i.e., source electronic device 102), the rectangular projection face 404 obtained from the decoded projection-based frame IMG' is re-sampled (e.g., up-sampled in its width direction) to recover the square projection face 402' at the decoder side (i.e., destination electronic device 104), where the square projection faces 402 and 402' have the same shape and the same size. The inverse non-uniform mapping function may be set by an inverse of the non-uniform mapping function expressed in formula (4).

Hence, regarding a pixel position located at a coordinate X of x-axis in the square projection face 402', a corresponding sampling point located at a coordinate x' of x-axis in the rectangular projection face 404 can be determined from an inverse of the non-uniform mapping function expressed in formula (4). Specifically, the sampling points are non-uniformly distributed in the width direction of the rectangular projection face 404. The pixel value of a position Qin the square projection face 402' is derived from using the pixel value of the corresponding sampling position q' in the rectangular projection face 404. Due to the non-uniform mapping in the width direction, a first re-sampled region of the square projection face 402' is derived from re-sampling a first source region of the rectangular projection face 404 with a first sampling rate (or first sampling density), and a second re-sampled region of the square projection face 402' is derived from re-sampling a second source region of the rectangular projection face 404 with a second sampling rate (or second sampling density), wherein the second sampling rate (or first sampling density) is different from the first sampling rate (or first sampling density).

A sampling point (i.e., the obtained pixel position q') in the rectangular projection face 404 may not be at an integer position. If an x-axis coordinate x' of a sampling point in the rectangular projection face 404 is a non-integer position, an interpolation filter (not shown) in the graphic rendering circuit 124 (particularly, re-sampling circuit 144) may be applied to integer pixels around the sampling point in the rectangular projection face 404 to derive the pixel value of the sampling point.

In yet another case where the rectangular projection face 404 is derived from down-sampling the square projection face 402 in its width direction and height direction and packed in the projection-based frame IMG for encoding at the encoder side (i.e., source electronic device 102), the rectangular projection face 404 obtained from the decoded projection-based frame IMG' is re-sampled (e.g., up-sampled in its width direction and height direction) to recover the square projection face 402' at the decoder side (i.e., destination electronic device 104), where the square projection faces 402 and 402' have the same shape and the same size.

Hence, regarding a pixel position located at a coordinate Y of y-axis in the square projection face 402', a corresponding sampling point located at a coordinate y' of y-axis in the rectangular projection face 404 can be determined from an inverse of the non-uniform mapping function expressed in formula (3). In addition, regarding a pixel position located at a coordinate X of x-axis in the square projection face 402', a corresponding sampling point located at a coordinate x' of x-axis in the rectangular projection face 404 can be determined from an inverse of the non-uniform mapping function expressed in formula (4). Specifically, the sampling points are non-uniformly distributed in the height direction of the rectangular projection face 404, and are also non-uniformly distributed in the width direction of the rectangular projection face 404. The pixel value of a position Qin the square projection face 402' is derived from using the pixel value of the corresponding sampling position q' in the rectangular projection face 404. Due to the non-uniform mapping in the height direction and the width direction, a first re-sampled region of the square projection face 402' is derived from re-sampling a first source region of the rectangular projection face 404 with a first sampling rate (or first sampling density), and a second re-sampled region in the square projection face 402' is derived from re-sampling a second source region of the rectangular projection face 404 with a second sampling rate (or second sampling density), where the second sampling rate (or second sampling density) is different from the first sampling rate (or first sampling density).

A sampling point (i.e., the obtained pixel position q') in the rectangular projection face 404 may not be at an integer position. If at least one of an x-axis coordinate x' and a y-axis coordinate y' of a corresponding sampling point in the rectangular projection face 404 is a non-integer position, an interpolation filter (not shown) in the graphic rendering circuit 124 (particularly, re-sampling circuit 144) may be applied to integer pixels around the sampling point in the rectangular projection face 404 to derive the pixel value of the sampling point.

In above re-sampling examples shown in FIG. 4 and FIG. 6, a re-sampled projection face is obtained by re-sampling a projection face through encoder-side non-uniform mapping (or decoder-side inverse non-uniform mapping), where the re-sampled projection face and the projection face have the same shape type (e.g., the shape of a rectangle) but different sizes. However, this is for illustrative purposes only, and is not meant to be a limitation of the present invention.

Figure 8:
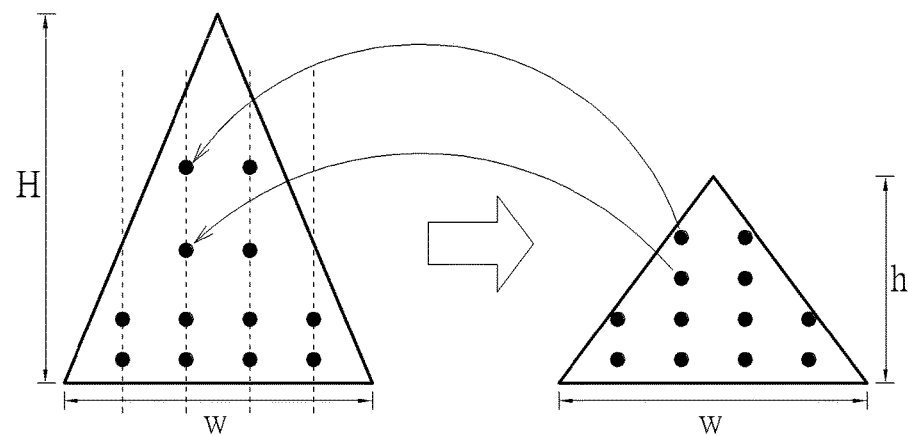
FIG. 8 is a diagram illustrating a first alternative example of re-sampling a projection face through non-uniform mapping (or inverse non-uniform mapping) according to an embodiment of the present invention.

FIG. 8 is a diagram illustrating a first alternative example of re-sampling a projection face through non-uniform mapping (or inverse non-uniform mapping) according to an embodiment of the present invention. In this example, the re-sampled projection face and the source projection face have the same shape type (e.g., the shape of a triangle) but different sizes. Specifically, down-sampling from height H to height h with the same width w is performed by non-uniform mapping (or inverse non-uniform mapping) for a triangle.

Figure 9:
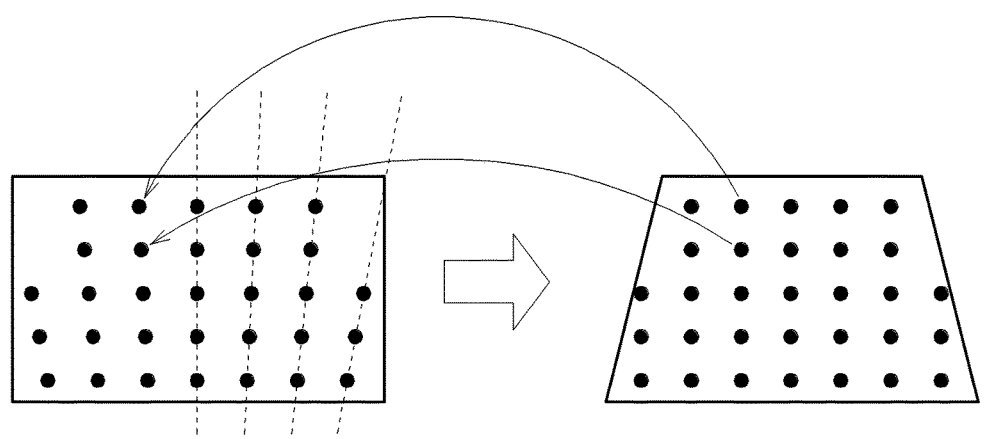
FIG. 9 is a diagram illustrating a second alternative example of re-sampling a projection face through non-uniform mapping (or inverse non-uniform mapping) according to an embodiment of the present invention.

FIG. 9 is a diagram illustrating a second alternative example of re-sampling a projection face through non-uniform mapping (or inverse non-uniform mapping) according to an embodiment of the present invention. In this example, the re-sampled projection face and the source projection face have different shape types (e.g., the shape of a rectangle and the shape of a trapezoid). Specifically, re-sampling a rectangle to a trapezoid is performed by non-uniform mapping (or inverse non-uniform mapping).

Figure 10:
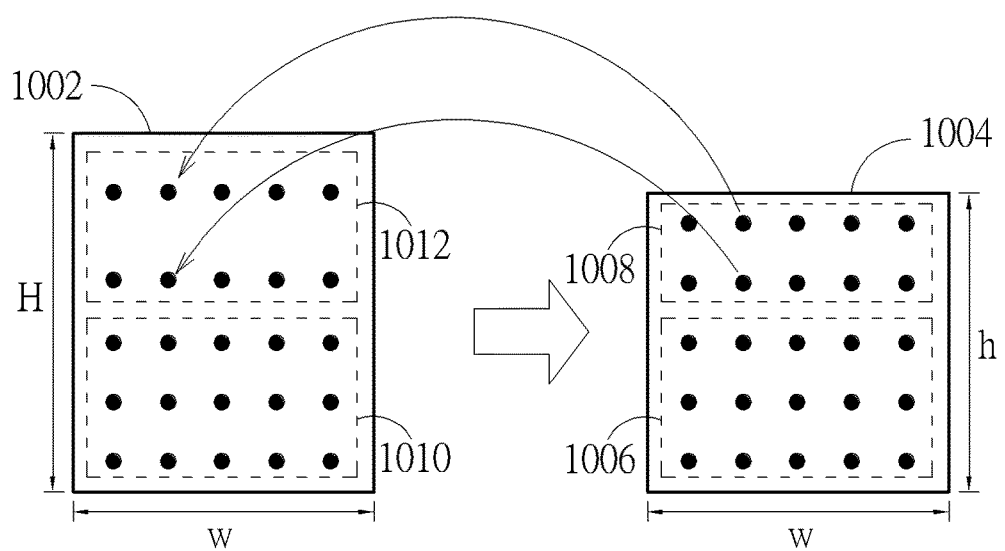
FIG. 10 is a diagram illustrating a third alternative example of re-sampling a projection face through non-uniform mapping (or inverse non-uniform mapping) according to an embodiment of the present invention.

In above re-sampling examples shown in FIG. 4 and FIG. 6, the re-sampled projection face is obtained by applying encoder-side non-uniform mapping (or decoder-side inverse non-uniform mapping) to the whole source projection face. However, this is for illustrative purposes only, and is not meant to be a limitation of the present invention. FIG. 10 is a diagram illustrating a third alternative example of re-sampling a projection face through non-uniform mapping (or inverse non-uniform mapping) according to an embodiment of the present invention. In this example, non-uniform mapping (or inverse non-uniform mapping) is applied to only a part of a projection face. The re-sampled square projection face 1004 with height h and width w is obtained from the rectangular projection face 1002 with height H and width w. The re-sampled square projection face 1004 has a top part 1008 and a bottom part 1006. The rectangular projection face has a top part 1012 and a bottom part 1010. Down-sampling from height H to height h with the same width w is performed by non-uniform mapping (or inverse non-uniform mapping), where the non-uniform mapping (or inverse non-uniform mapping) is applied to the top part 1012 only. In this example, the bottom part 1010 retains the same, such that the bottom part 1006 of the re-sampled square projection face 1004 is directly set by the bottom part 1010 of the rectangular projection face 1002. Hence, an image content of the bottom part 1006 of the re-sampled square projection face 1004 is the same as the image content of the bottom part 1010 of the rectangular projection face 1002.

Figure 11:
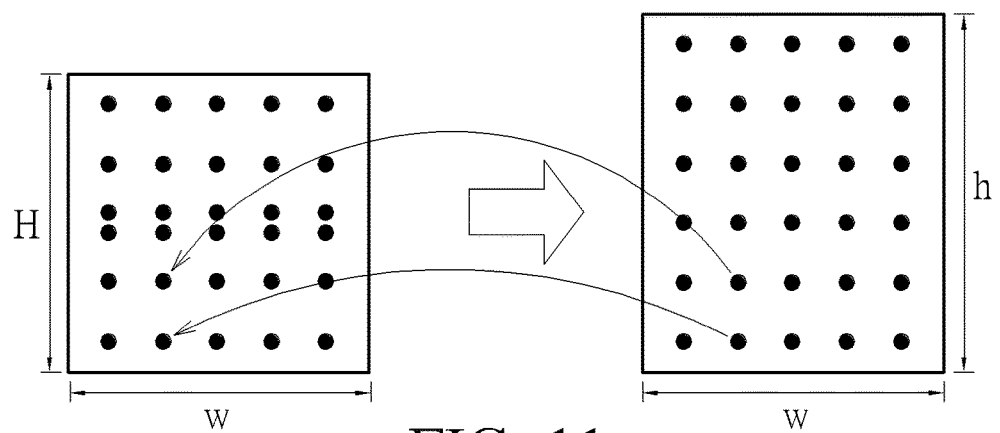
FIG. 11 is a diagram illustrating a fourth alternative example of re-sampling a projection face through non-uniform mapping (or inverse non-uniform mapping) according to an embodiment of the present invention.

As shown in FIG. 10, down-sampling from height H to height h with the same width w can be achieved by non-uniform mapping (or inverse non-uniform mapping). Alternatively, up-sampling can be achieved by non-uniform mapping (or inverse non-uniform mapping). FIG. 11 is a diagram illustrating a fourth alternative example of re-sampling a projection face through non-uniform mapping (or inverse non-uniform mapping) according to an embodiment of the present invention. In this example, up-sampling from height H to height h with the same width w can be performed by non-uniform mapping (or inverse non-uniform mapping).

Figure 12:
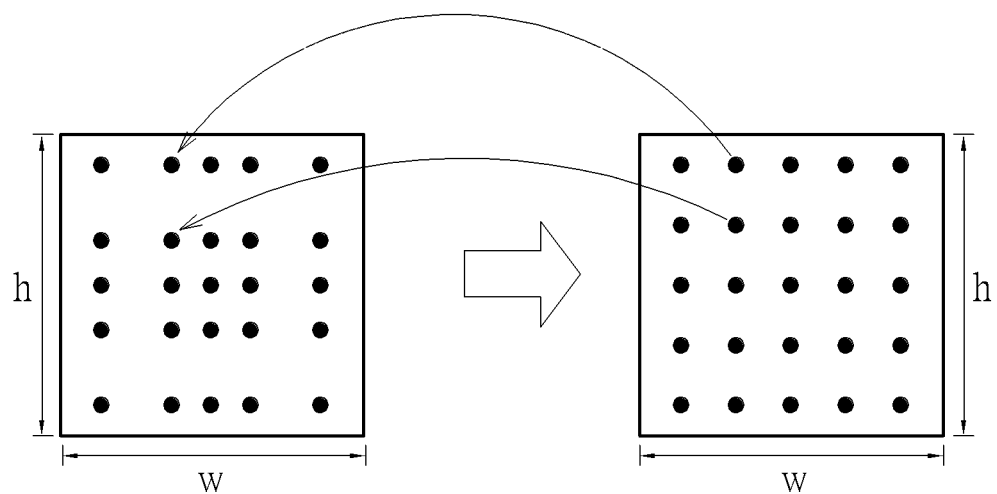
FIG. 12 is a diagram illustrating a fifth alternative example of re-sampling a projection face through non-uniform mapping (or inverse non-uniform mapping) according to an embodiment of the present invention.

As shown in FIG. 10 and FIG. 11, the source projection face (i.e., a projection face available before re-sampling) and the re-sampled projection face (i.e., a projection face available after re-sampling) have different sizes. Alternatively, re-sampling without size change can be achieved by non-uniform mapping (or inverse non-uniform mapping). FIG. 12 is a diagram illustrating a fifth alternative example of re-sampling a projection face through non-uniform mapping (or inverse non-uniform mapping) according to an embodiment of the present invention. In this example, re-sampling with the same width w and height h is performed by non-uniform mapping (or inverse non-uniform mapping). Hence, the source projection face and the re-sampled projection face have the same shape type and the same size, but have different image contents.

The encoder-side non-uniform mapping (or decoder-side inverse non-uniform mapping) can be performed along only a single mapping direction or can be performed along different mapping directions. For example, the encoder-side non-uniform mapping (or decoder-side inverse non-uniform mapping) can be performed along the x-axis direction, the y-axis direction, or both. In some embodiments of the present invention, different mapping directions of non-uniform mapping (or inverse non-uniform mapping) are not necessarily orthogonal.

Figure 13:
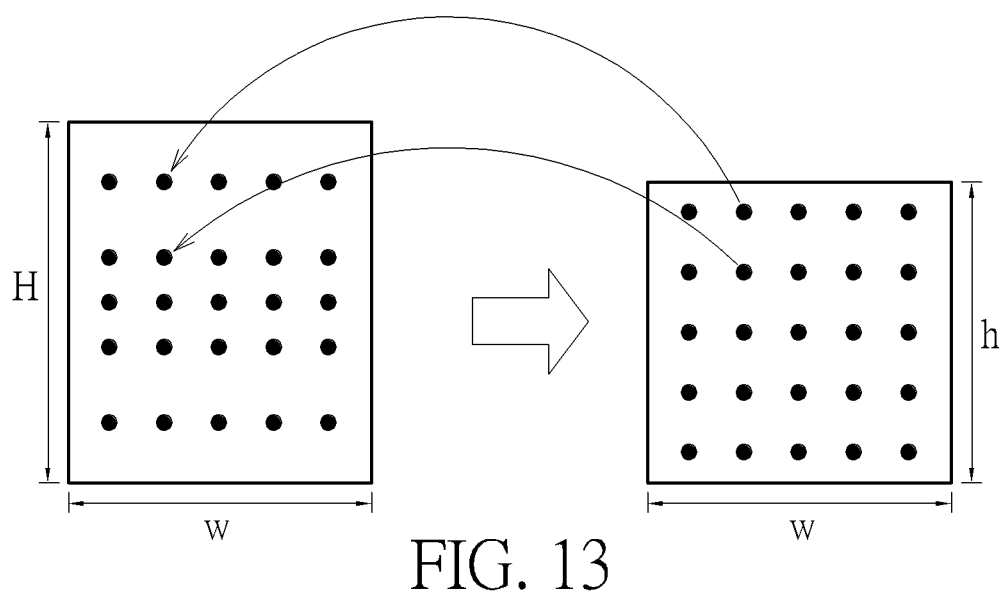
FIG. 13 is a diagram illustrating a sixth alternative example of re-sampling a projection face through non-uniform mapping (or inverse non-uniform mapping) according to an embodiment of the present invention.

FIG. 13 is a diagram illustrating a sixth alternative example of re-sampling a projection face through non-uniform mapping (or inverse non-uniform mapping) according to an embodiment of the present invention. In this example, Y-axis down-sampling from height H to height h with the same width w is performed by non-uniform mapping (or inverse non-uniform mapping), where sampling points closer to the middle of the source projection face have a higher sampling rate (i.e., high sampling density).

Figure 14:
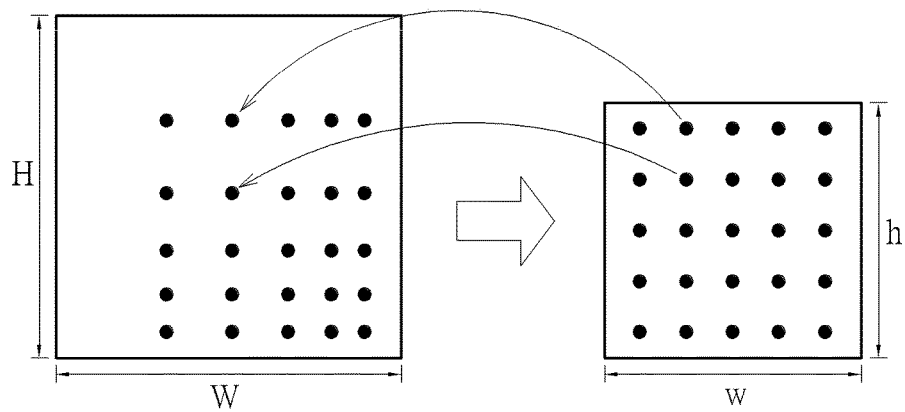
FIG. 14 is a diagram illustrating a seventh alternative example of re-sampling a projection face through non-uniform mapping (or inverse non-uniform mapping) according to an embodiment of the present invention.

FIG. 14 is a diagram illustrating a seventh alternative example of re-sampling a projection face through non-uniform mapping (or inverse non-uniform mapping) according to an embodiment of the present invention. In this example, two-directional down-sampling from height H and width W to height h and width w is performed by non-uniform mapping (or inverse non-uniform mapping), where sampling points closer to the bottom-right corner of the source projection face have a higher sampling rate (i.e., high sampling density).

Figure 15:
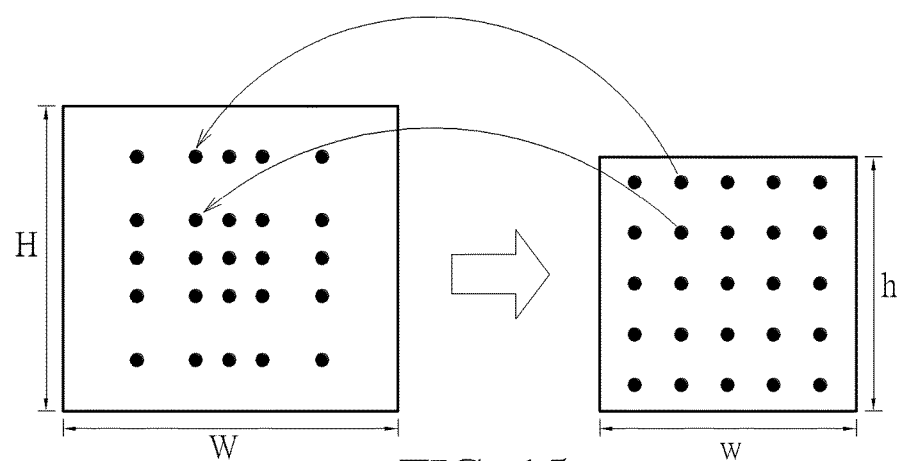
FIG. 15 is a diagram illustrating an eighth alternative example of re-sampling a projection face through non-uniform mapping (or inverse non-uniform mapping) according to an embodiment of the present invention.

FIG. 15 is a diagram illustrating an eighth alternative example of re-sampling a projection face through non-uniform mapping (or inverse non-uniform mapping) according to an embodiment of the present invention. In this example, two-directional down-sampling from height H and width W to height h and width w is performed by non-uniform mapping (or inverse non-uniform mapping), where sampling points closer to the center of the source projection face have a higher sampling rate (i.e., high sampling density).

Figure 16:
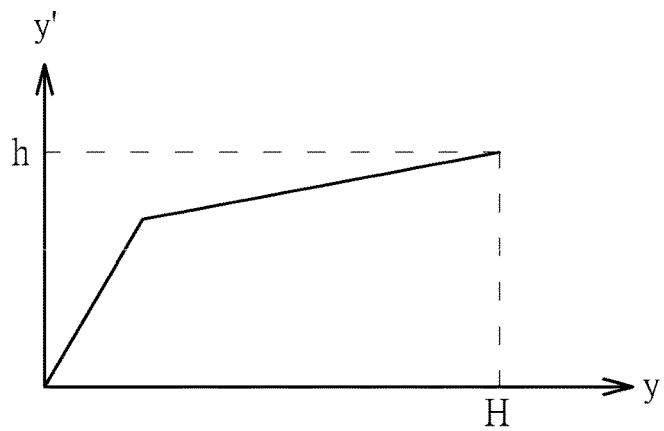
FIG. 16 is a diagram illustrating a curve of a first alternative non-uniform mapping function according to an embodiment of the present invention.
Figure 17:
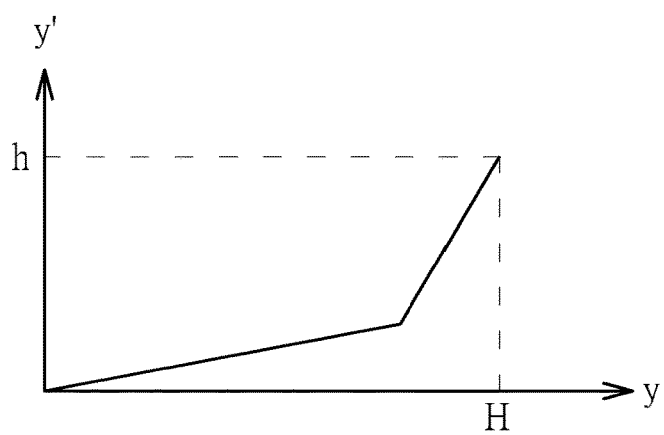
FIG. 17 is a diagram illustrating a curve of a second alternative non-uniform mapping function according to an embodiment of the present invention.
Figure 18:
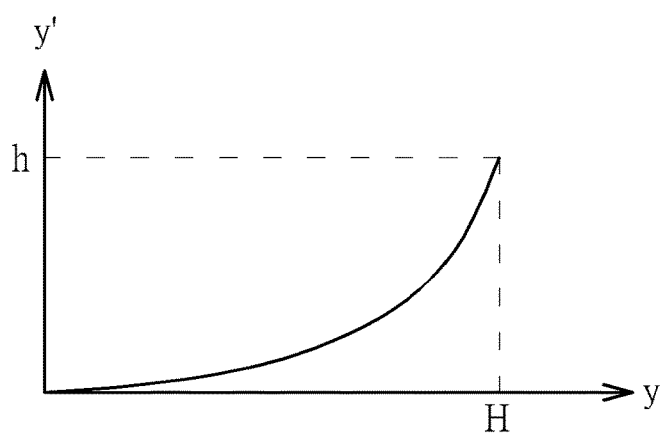
FIG. 18 is a diagram illustrating a curve of a third alternative non-uniform mapping function according to an embodiment of the present invention.

It should be noted that the aforementioned non-uniform mapping functions are for illustrative purposes, and are not meant to be limitations of the present invention. In some embodiments of the present invention, a different non-uniform mapping function may be employed by the re-sampling circuit 134 of the source electronic device 102 for re-sampling the shape. Other non-uniform mapping functions for y-axis re-sampling are illustrated in FIGS. 16-18. It should be noted that the non-uniform mapping functions illustrated in FIGS. 16-18 may also be used for x-axis re-sampling. Further, when a non-uniform mapping function is employed by the re-sampling circuit 134 of the source electronic device 102 for re-sampling the shape, an inverse of the non-uniform mapping function is employed by the re-sampling circuit 144 of the destination electronic device 104 for inversely re-sampling the shape.

In practice, the non-uniform mapping function can be implemented using any non-decreasing function passing through (0, 0) and (1, 1). That is, a curve of the non-decreasing non-uniform mapping function starts from (0, 0) and ends at (1, 1). In one exemplary non-uniform mapping function design, the start point of non-uniform mapping corresponds to the highest sampling rate (i.e., highest sampling density), and the end point of non-uniform mapping corresponds to the lowest sampling rate (i.e., lowest sampling density). Taking the Y-axis down-sampling in FIG. 13 for example, the start point of non-uniform mapping is at the middle of the source projection face. Taking the two-directional down-sampling in FIG. 14 for example, the start point of non-uniform mapping is at the bottom-right corner of the source projection face. Taking the two-directional down-sampling in FIG. 15 for example, the start point of non-uniform mapping is at the center of the source projection face. However, these are for illustrative purposes only, and are not meant to be limitations of the present invention. In another exemplary non-uniform mapping function design, the start point of non-uniform mapping corresponds to the lowest sampling rate (i.e., lowest sampling density), and the end point of non-uniform mapping corresponds to the highest sampling rate (i.e., highest sampling density).

Like the non-uniform mapping function, the corresponding inverse non-uniform mapping function is also a non-decreasing function passing through (0, 0) and (1, 1). In one exemplary inverse non-uniform mapping function design, the start point of inverse non-uniform mapping corresponds to the highest sampling rate (i.e., highest sampling density), and the end point of inverse non-uniform mapping corresponds to the lowest sampling rate (i.e., lowest sampling density). In another exemplary inverse non-uniform mapping function design, the start point of inverse non-uniform mapping corresponds to the lowest sampling rate (i.e., lowest sampling density), and the end point of inverse non-uniform mapping corresponds to the highest sampling rate (i.e., highest sampling density).

The non-uniform mapping function may have various types. By way of example, but not limitation, the non-uniform mapping function may be an equal-area mapping function, an equal-angular mapping function, a piecewise linear function, an exponential function, a polynomial function, or a power function.

As mentioned above, the encoder-side non-uniform mapping (or decoder-side inverse non-uniform mapping) can be performed along only a single mapping direction or can be performed along different mapping directions. In practice, the encoder-side non-uniform mapping (or decoder-side inverse non-uniform mapping) can be applied in any direction(s), depending upon the actual design considerations.

Figure 19:
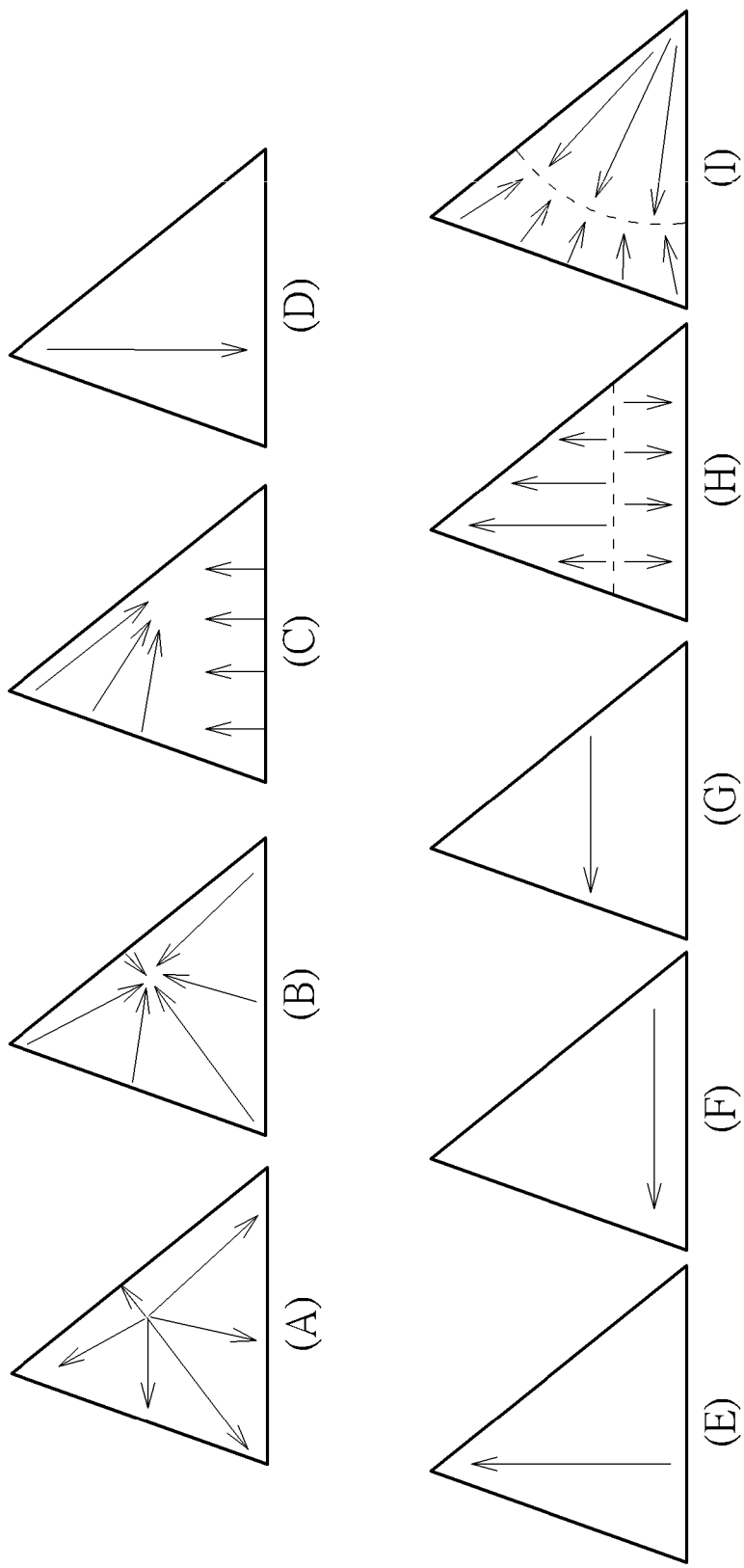
FIG. 19 is a diagram illustrating examples of different mapping directions of non-uniform mapping (or inverse non-uniform mapping) for a triangular projection face according to an embodiment of the present invention.

FIG. 19 is a diagram illustrating examples of different mapping directions of non-uniform mapping (or inverse non-uniform mapping) for a triangular projection face according to an embodiment of the present invention. The sub-diagram (A) shows a plurality of mapping directions being radial directions from the same start point inside a triangular projection face toward different end points in the triangular projection face. The sub-diagram (B) shows a plurality of mapping directions being concentrated directions that are contrary to the radial directions. The sub-diagram (C) shows two types of mapping directions applied in a triangular projection face. The sub-diagram (D) shows a mapping direction from a vertex of a triangular projection face toward an edge of the triangular projection face. The sub-diagram (E) shows a mapping direction from an edge of a triangular projection face toward a vertex of the triangular projection face. The sub-diagram (F) shows a mapping direction from one vertex of a triangular projection face toward another vertex of the triangular projection face. The sub-diagram (G) shows a mapping direction from one edge of a triangular projection face toward another edge of the triangular projection face. The sub-diagram (H) shows a plurality of mapping directions from start points located at the same curve (which is represented by a dotted line) in a triangular projection face toward end points in the triangular projection face. The sub-diagram (I) shows a plurality of mapping directions from start points in a triangular projection face toward end points located at the same curve (which is represented by a dotted line) in the triangular projection face.

Figure 20:
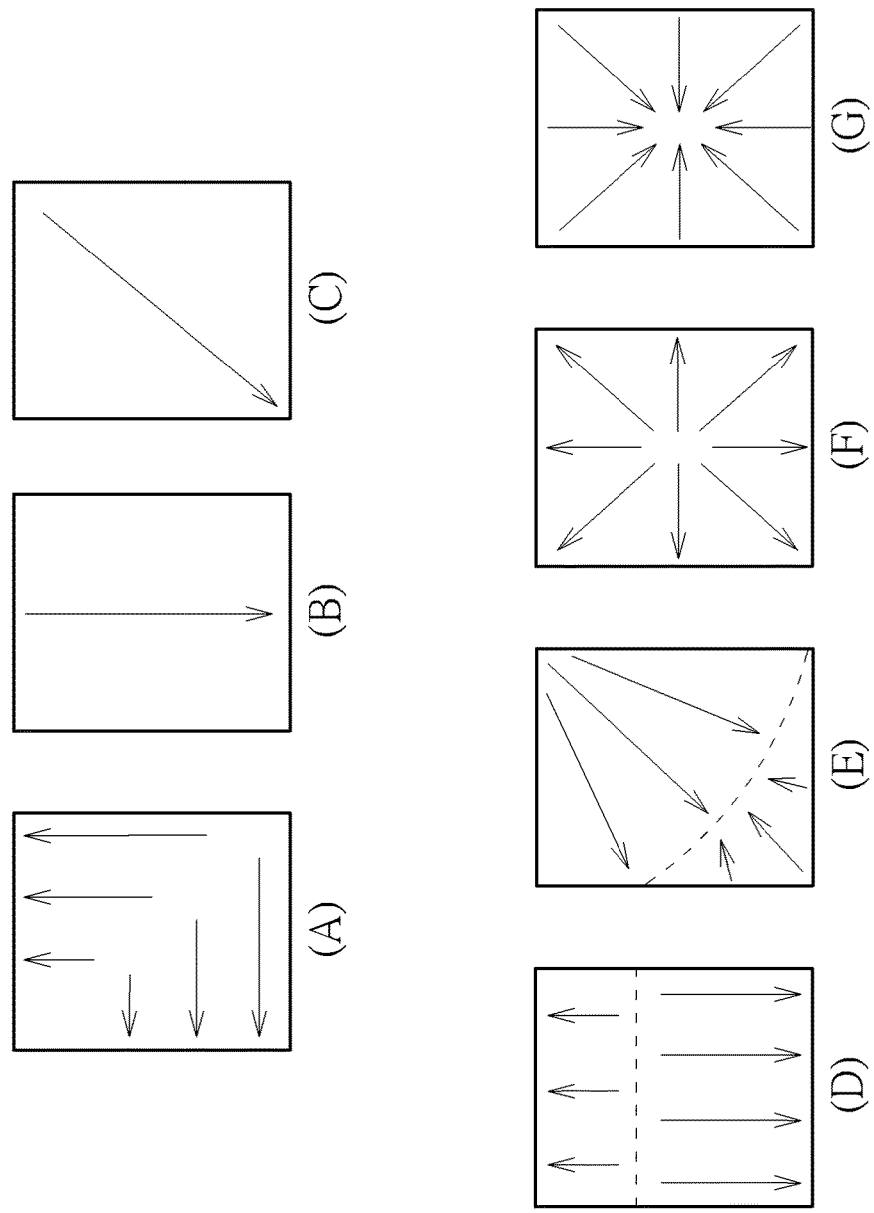
FIG. 20 is a diagram illustrating examples of different mapping directions of non-uniform mapping (or inverse non-uniform mapping) for a rectangular projection face according to an embodiment of the present invention.

FIG. 20 is a diagram illustrating examples of different mapping directions of non-uniform mapping (or inverse non-uniform mapping) for a rectangular projection face according to an embodiment of the present invention. The sub-diagram (A) shows two types of mapping directions applied in a rectangular projection face. The sub-diagram (B) shows a mapping direction from one edge of a rectangular projection face toward another edge of the rectangular projection face. The sub-diagram (C) shows a mapping direction from one vertex of a rectangular projection face toward another vertex of the rectangular projection face. The sub-diagram (D) shows a plurality of mapping directions from start points located at the same curve (which is represented by a dotted line) in a rectangular projection face toward end points in the rectangular projection face. The sub-diagram (E) shows a plurality of mapping directions from start points in a rectangular projection face toward end points located at the same curve (which is represented by a dotted line) in the rectangular projection face. The sub-diagram (F) shows a plurality of mapping directions being radial directions from the same start point inside a rectangular projection face toward different end points in the rectangular projection face. The sub-diagram (G) shows a plurality of mapping directions being concentrated directions that are contrary to the radial directions.

Figure 21:
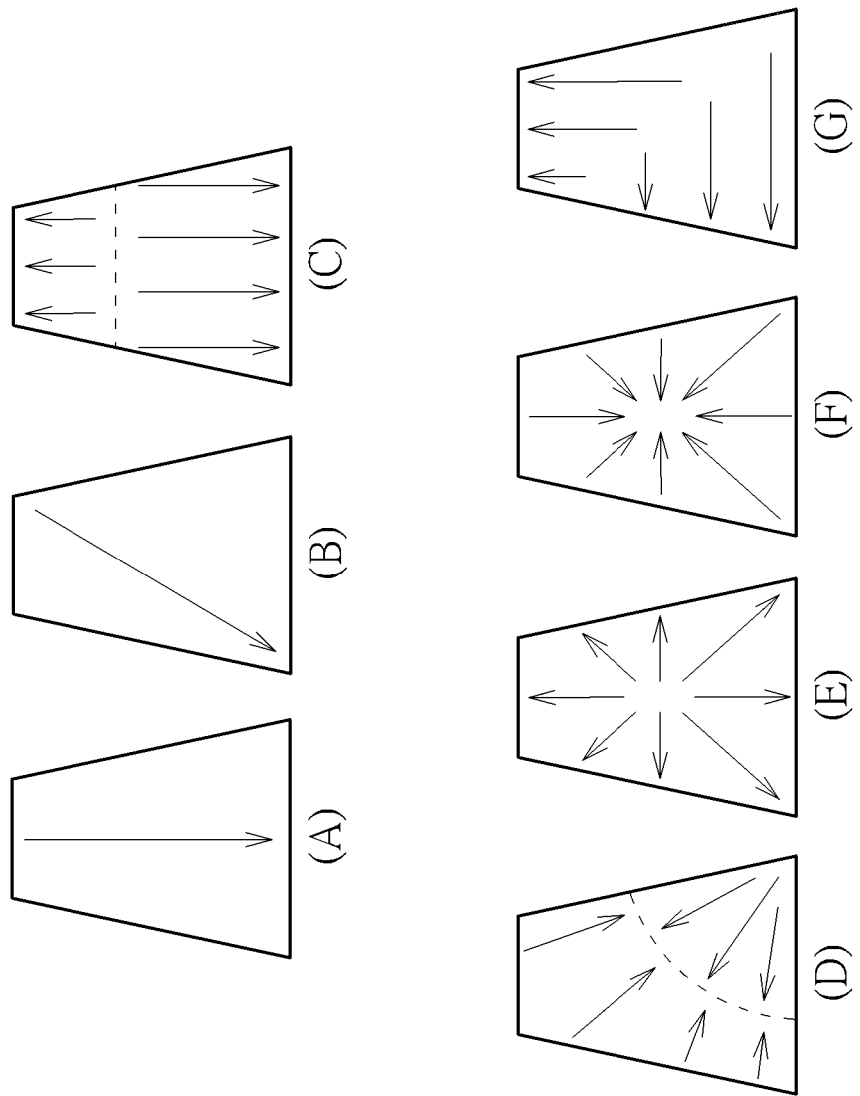
FIG. 21 is a diagram illustrating examples of different mapping directions of non-uniform mapping (or inverse non-uniform mapping) for a quadrilateral projection face according to an embodiment of the present invention.

FIG. 21 is a diagram illustrating examples of different mapping directions of non-uniform mapping (or inverse non-uniform mapping) for a quadrilateral projection face according to an embodiment of the present invention. The sub-diagram (A) shows a mapping direction from one edge of a quadrilateral projection face toward another edge of the quadrilateral projection face. The sub-diagram (B) shows a mapping direction from one vertex of a quadrilateral projection face toward another vertex of the quadrilateral projection face. The sub-diagram (C) shows a plurality of mapping directions from start points located at the same curve (which is represented by a dotted line) in a quadrilateral projection face toward end points in the quadrilateral projection face. The sub-diagram (D) shows a plurality of mapping directions from start points in a quadrilateral projection face toward end points located at the same curve (which is represented by a dotted line) in the quadrilateral projection face. The sub-diagram (E) shows a plurality of mapping directions being radial directions from the same start point inside a quadrilateral projection face toward different end points in the quadrilateral projection face. The sub-diagram (F) shows a plurality of mapping directions being concentrated directions that are contrary to the radial directions. The sub-diagram (G) shows two types of mapping directions applied in a quadrilateral projection face.

Figure 22:
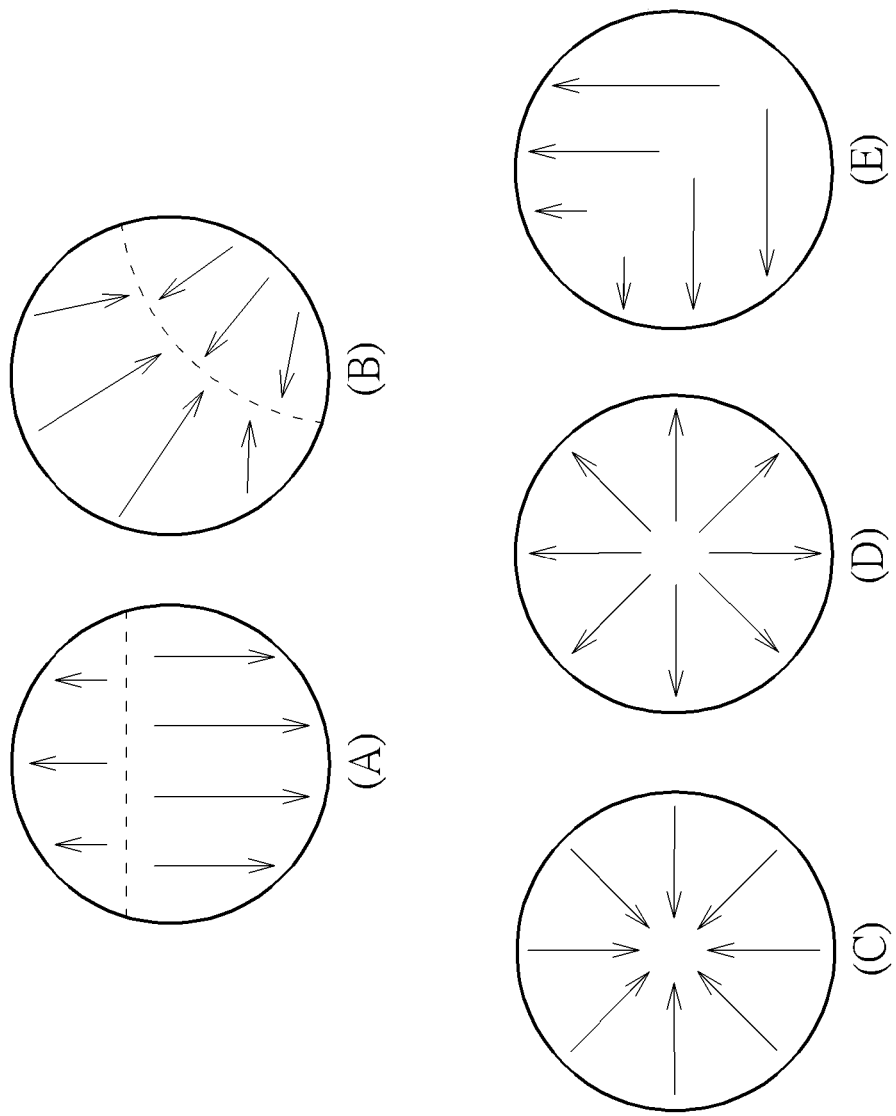
FIG. 22 is a diagram illustrating examples of different mapping directions of non-uniform mapping (or inverse non-uniform mapping) for a circular projection face according to an embodiment of the present invention.

FIG. 22 is a diagram illustrating examples of different mapping directions of non-uniform mapping (or inverse non-uniform mapping) for a circular projection face according to an embodiment of the present invention. The sub-diagram (A) shows a plurality of mapping directions from start points located at the same curve (which is represented by a dotted line) in a circular projection face toward end points in the circular projection face. The sub-diagram (B) shows a plurality of mapping directions from start points in a circular projection face toward end points located at the same curve (which is represented by a dotted line) in the circular projection face. The sub-diagram (C) shows a plurality of mapping directions being concentrated directions from different start points in a circular projection face toward the same end point in the circular projection face. The sub-diagram (D) shows a plurality of mapping directions being radial directions that are contrary to the concentrated directions. The sub-diagram (E) shows two types of mapping directions applied in a circular projection face. The exemplary mapping directions shown in FIG. 22 may also be adopted by non-uniform mapping (or inverse non-uniform mapping) applied to an oval projection face.

As mentioned above, the re-sampling circuit 134 generates re-sampled projection face(s), and the packing circuit 136 generates the projection-based frame IMG with the re-sampled projection face(s) packed in the projection layout L_VR of the 360 VR projection format. In practice, the 360 VR projection format can be any projection format. By way of example, but not limitation, the non-uniform mapping/inverse non-uniform mapping is applicable to a variety of projection formats, including equirectangular projection, cubemap projection, pyramid projection, truncated sphere pyramid projection, viewport-based cube projection, octahedron projection, tetrahedron projection, tetragon quartz-based projection, icosahedron projection, hexagon quartz-based projection, segmented sphere projection, etc.

Figure 23:
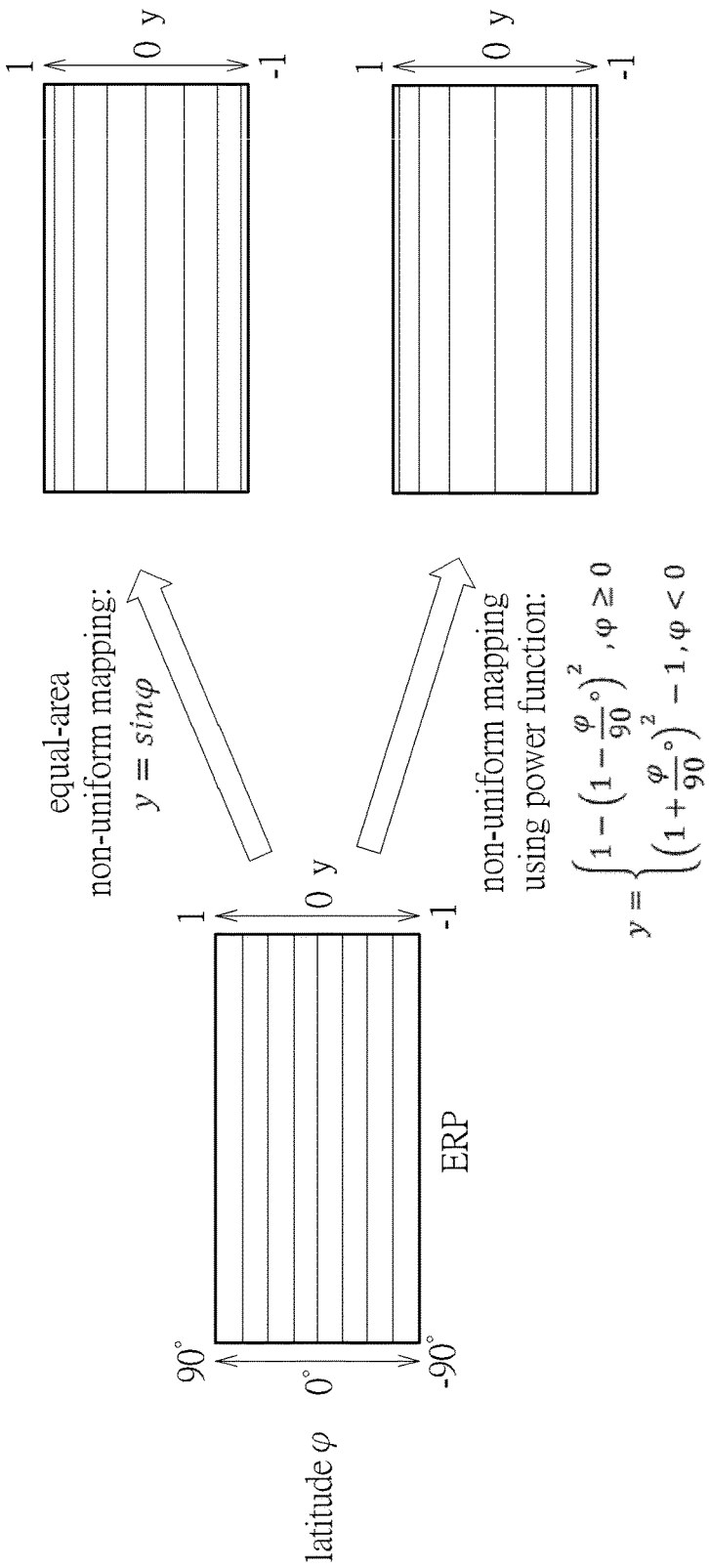
FIG. 23 is a diagram illustrating non-uniform mapping for equirectangular projection according to an embodiment of the present invention.

FIG. 23 is a diagram illustrating non-uniform mapping for equirectangular projection (ERP) according to an embodiment of the present invention. The projection circuit 132 may obtain a single projection face via an equirectangular projection of an omnidirectional image/video content of a sphere. The re-sampling circuit 134 may apply non-uniform mapping to the ERP face in a y-axis direction (i.e., a latitude direction of the ERP face), where the sampling rate (sampling density) is higher when sampling points in the ERP face are closer to the equator. In one exemplary design, the non-uniform mapping function may be set by an equal-area mapping function expressed in the following formula with the latitude $\varphi$.

$$y = \sin \varphi \quad (5)$$

In another exemplary design, the non-uniform mapping function may be set by a power function expressed in the following formula with the latitude $\varphi$.

$$y = \begin{cases} 1 - \left(1 - \frac{\varphi}{90}°\right)^2, & \varphi \geq 0 \\ \left(1 + \frac{\varphi}{90}°\right)^2 - 1, & \varphi < 0 \end{cases} \quad (6)$$

However, these are not meant to be limitations of the present invention. Alternatively, re-sampling of the ERP face may include uniform mapping, non-uniform mapping, or a combination of uniform mapping and non-uniform mapping.

Figure 24:
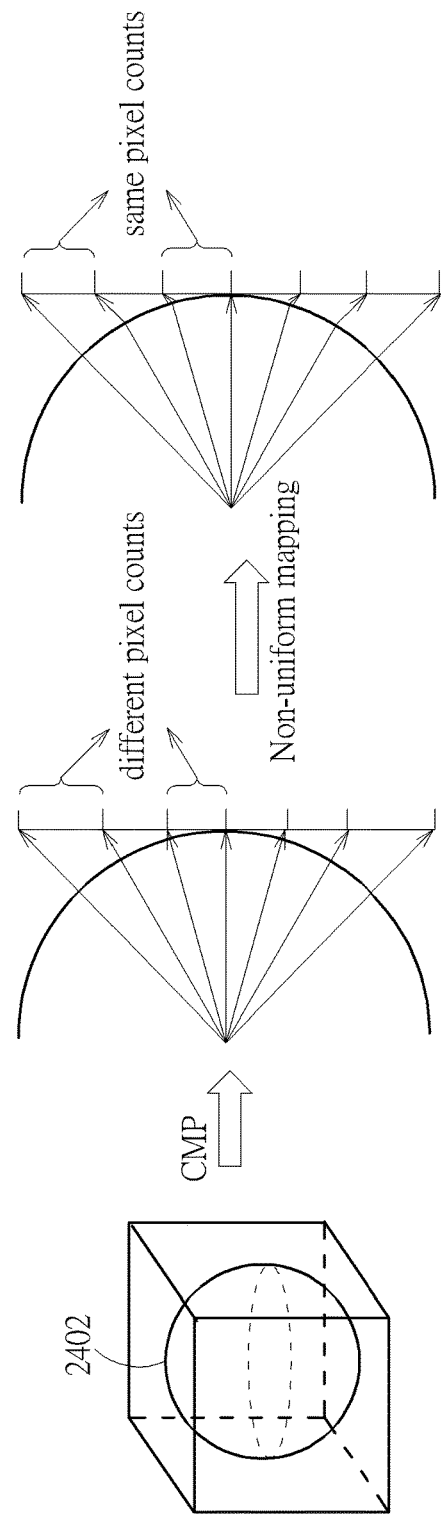
FIG. 24 is a diagram illustrating non-uniform mapping for cubemap projection according to an embodiment of the present invention.

FIG. 24 is a diagram illustrating non-uniform mapping for cubemap projection (CMP) according to an embodiment of the present invention. The omnidirectional image/video content of a sphere 2402 is mapped/projected onto six square projection faces, including a top face, a bottom face, a front face, a back face, a left face and a right face, via a cubemap projection. In accordance with the general cubemap projection, same degrees of angles are projected to a face with different pixel counts, resulting in over-sampling on the boundaries of the face. After the square projection faces are obtained by the projection circuit 132 via the cubemap projection of the omnidirectional image/video content on the sphere 2402, the re-sampling circuit 134 may apply non-uniform mapping to at least one of the square projection faces, where the sampling rate (sampling density) is higher when sampling points in a square projection face are closer to the equator. For example, a re-sampled square projection face may be equivalent to an equal-angular projection face obtained by projecting same degrees of angles with same pixel counts, where each interval between two sampling points has the same angle on the sphere 2402. However, this is not meant to be a limitation of the present invention. Alternatively, re-sampling of the CMP face may include uniform mapping, non-uniform mapping, or a combination of uniform mapping and non-uniform mapping.

Figure 25:
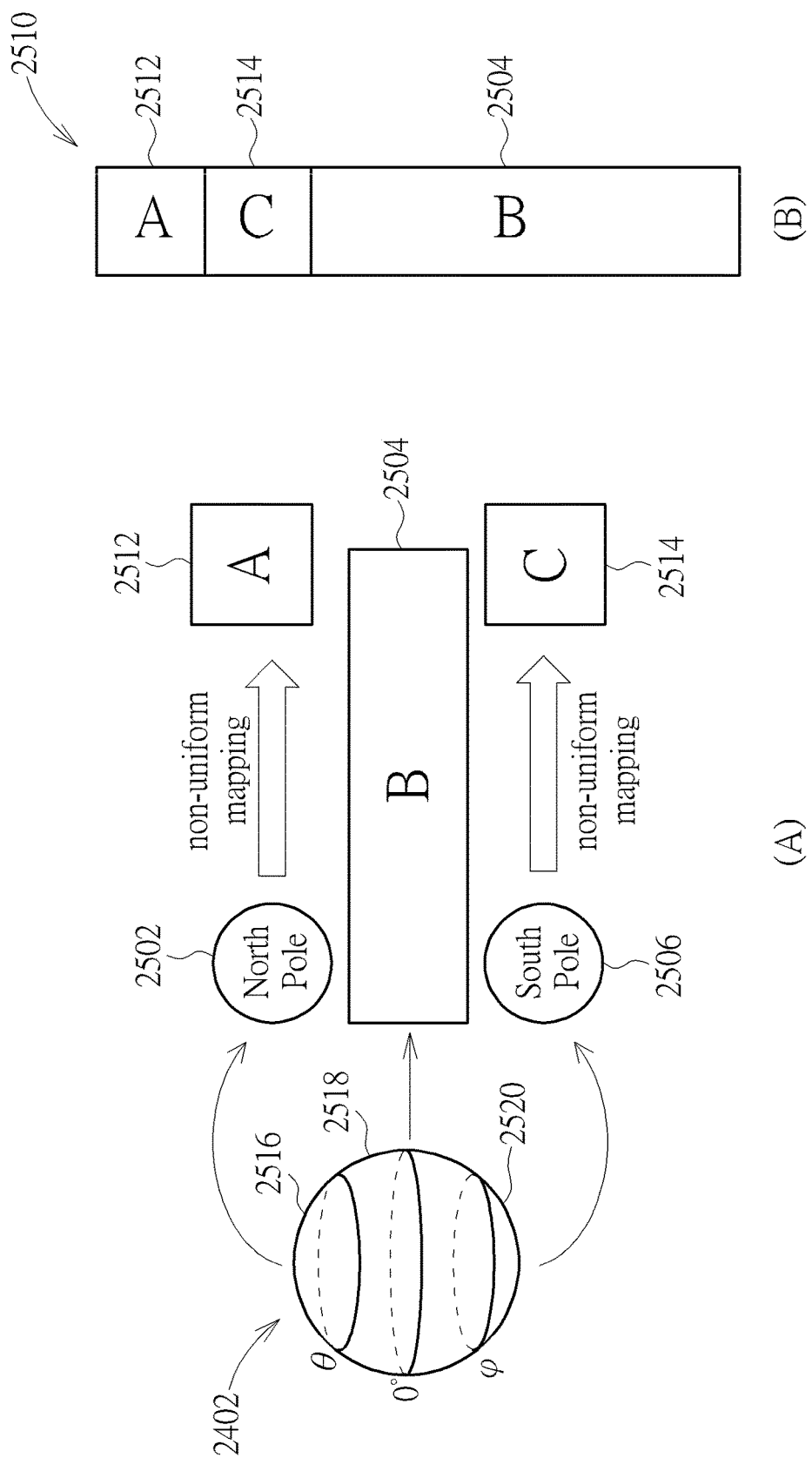
FIG. 25 is a diagram illustrating non-uniform mapping for segmented sphere projection according to an embodiment of the present invention.

FIG. 25 is a diagram illustrating non-uniform mapping for segmented sphere projection (SSP) according to an embodiment of the present invention. As shown in the sub-diagram (A), a surface of the sphere 2402 is partitioned into a north polar region 2516 centered at the north pole, a south polar region 2520 centered at the south pole, and a non-polar ring-shaped segment (e.g., an equatorial segment) 2518 between the north polar region 2516 and the south polar region 2520. A latitude of an equator of the sphere 2402 is 0°. As shown in FIG. 25, the lowest latitude of the north polar region 2516 is denoted by θ, and the highest latitude of the south polar region 2520 is denoted by φ. It should be noted that θ may be equal to or different from ω, depending upon the actual design considerations. For example, θ=φ=45°. In accordance with SSP, the north polar region 2516 of the sphere 2402 is projected/mapped onto a first circular projection face (labeled by "North Pole") 2502, the south polar region 2520 is projected/mapped onto a second circular projection face (labeled by "South Pole") 2506, and the non-polar ring-shaped segment 2518 is projected/mapped onto a rectangular projection face (labeled by "B") 2504.

After the first circular projection face 2502, the rectangular projection face 2504, and the second circular projection face 2506 are obtained by the projection circuit 132 via the segmented sphere projection of the omnidirectional image/video content on the sphere 2402, the re-sampling circuit 134 may apply non-uniform mapping to at least one of the first circular projection face 2502, the rectangular projection face 2504, and the second circular projection face 2506. In this example, each of the first circular projection face 2502 and the second circular projection face 2506 is re-sampled to another shape (e.g., the shape of a rectangle) by non-uniform mapping. Hence, the re-sampling circuit 134 obtains a first rectangular projection face (labeled by "A") 2512 by re-sampling the first circular projection face 2502, and obtains a second rectangular projection face (labeled by "C") 2514 by re-sampling the second circular projection face 2506. However, this is not meant to be a limitation of the present invention. Alternatively, re-sampling of the SSP face may include uniform mapping, non-uniform mapping, or a combination of uniform mapping and non-uniform mapping.

As shown in the sub-diagram (B), the re-sampled projection faces (i.e., first rectangular projection face 2512 and second rectangular projection face 2514) and the rectangular projection face 2504 are packed in a projection layout 2510 of the SSP format. Since each of the projection faces 2512, 2514 and 2504 has the shape of a rectangle, the projection-based frame IMG with the projection layout 2510 is not required to have dummy areas (e.g., black areas, gray areas, or white areas) filled therein.

Figure 26:
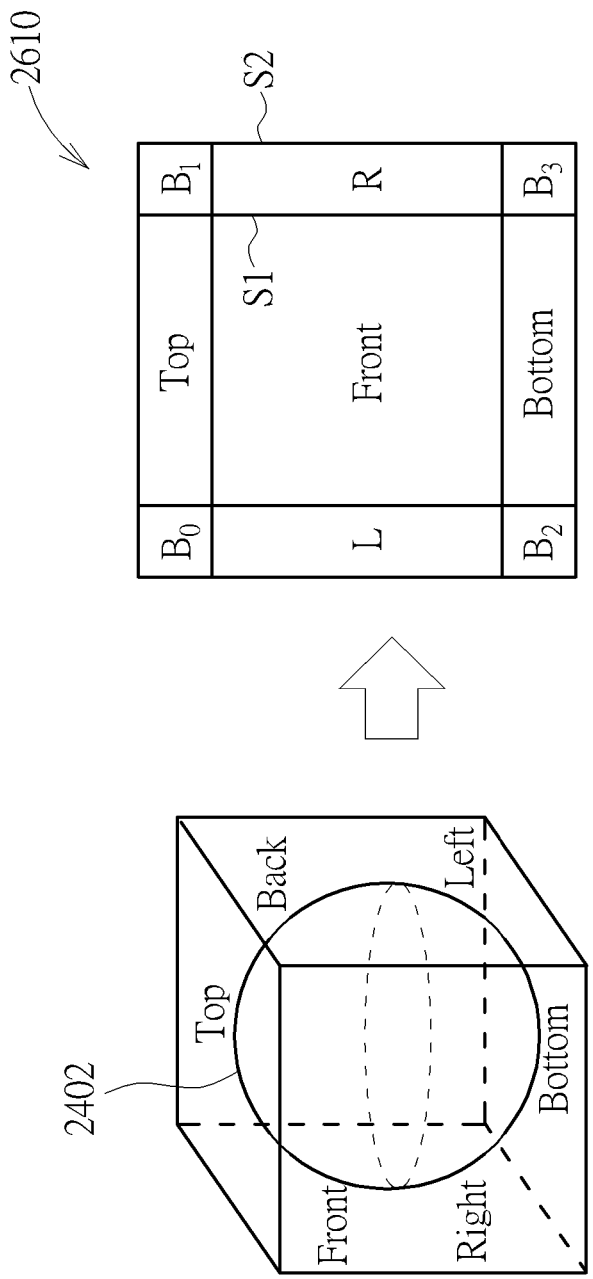
FIG. 26 is a diagram illustrating non-uniform mapping for viewport-based cube projection according to an embodiment of the present invention.

FIG. 26 is a diagram illustrating non-uniform mapping for viewport-based cube projection according to an embodiment of the present invention. The omnidirectional image/video content of the sphere 2402 is mapped/projected onto six square projection faces, including a top face (labeled by "Top"), a bottom face (labeled by "Bottom"), a front face (labeled by "Front"), a back face (labeled by "Back"), a left face (labeled by "Left") and a right face (labeled by "Right"). After the square projection faces are obtained by the projection circuit 132 via the cubemap projection of the omnidirectional image/video content on the sphere 2402, the re-sampling circuit 134 may apply non-uniform mapping to some or all of the square projection faces. For example, each of the top face, left face, bottom face, right face and back face is down-scaled by non-uniform mapping. For another example, the front face may also be re-sampled by non-uniform mapping.

The sampling rate (sampling density) is higher when sampling points in the square projection face are closer to the front face or main view. Taking the re-sampled right face (which is a rectangular projection face) for example, pixels close to the edge S1 are determined by re-sampling a first region of the original right face (which is a square projection face) with a higher sampling rate (sampling density), and pixels close to the edge S2 are determined by re-sampling a second region of the original right face (which is a square projection face) with a lower sampling rate (sampling density). However, this is not meant to be a limitation of the present invention. Alternatively, re-sampling of the CMP face may include uniform mapping, non-uniform mapping, or a combination of uniform mapping and non-uniform mapping.

The packing circuit 136 packs a top face "Top" (which is a re-sampled projection face), a bottom face "Bottom" (which is a re-sampled projection face), a front face "Front" (which is a main view that may be a projection face without re-sampling or may be a re-sampled projection face), a back face (which is a re-sampled projection face), a left face "L" (which is a re-sampled projection face) and a right face "R" (which is a re-sampled projection face) in the viewport-based cube projection layout 2610, where the re-sampled bottom face is equally divided into four parts $B_0, B_1, B_2, B_3$ placed at four corners of the viewport-based cube projection layout 2610, respectively.

Figure 27:
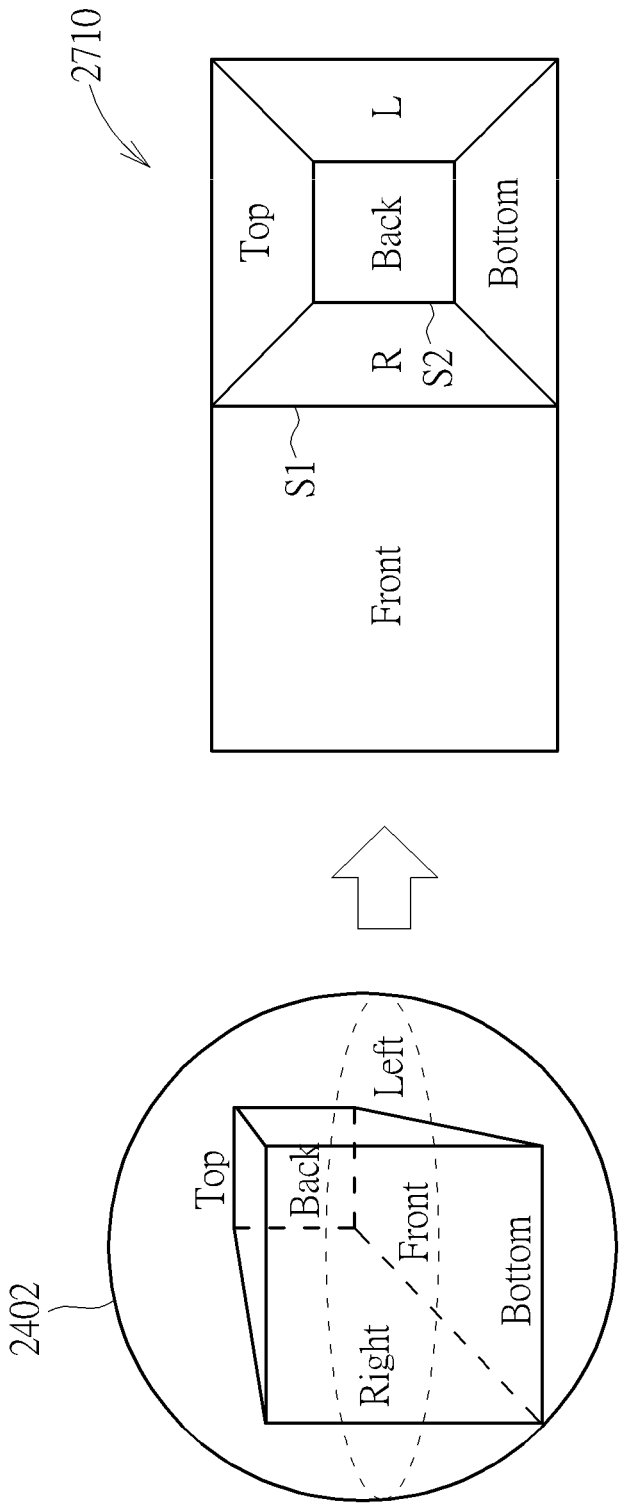
FIG. 27 is a diagram illustrating non-uniform mapping for truncated square pyramid projection according to an embodiment of the present invention.

FIG. 27 is a diagram illustrating non-uniform mapping for truncated square pyramid projection (TSP) according to an embodiment of the present invention. The omnidirectional image/video content of the sphere 2402 is mapped/projected onto two square projection faces (i.e., a front face labeled by "Front" and a back face labeled by "Back") and four trapezoidal projection faces (i.e., a top face labeled by "Top", a right face labeled by "Right", a bottom face labeled by "Bottom", and a left face labeled by "Left") via a truncated square pyramid projection. After square projection faces and trapezoidal projection faces of the truncated square pyramid are obtained by the projection circuit 132, the re-sampling circuit 134 may apply non-uniform mapping to at least one of the square projection faces and the trapezoidal projection faces. For example, the square projection faces and the trapezoidal projection faces may be re-sampled using different non-uniform mapping directions, respectively.

The sampling rate (sampling density) is higher when sampling points in a projection face (e.g., one of the trapezoidal projection faces) are closer to the front face or main view. Taking the re-sampled right face (which is a trapezoidal projection face) for example, pixels close to the edge S1 are determined by re-sampling a first region of the original right face (which is a trapezoidal projection face) with a higher sampling rate (sampling density), and pixels close to the edge S2 are determined by re-sampling a second region of the original right face (which is a trapezoidal projection face) with a lower sampling rate (sampling density). However, this is not meant to be a limitation of the present invention. Alternatively, re-sampling of the TSP face may include uniform mapping, non-uniform mapping, or a combination of uniform mapping and non-uniform mapping.

The packing circuit 136 packs a top face "Top" (which may be a projection face without re-sampling or may be a re-sampled projection face), a bottom face "Bottom" (which may be a projection face without re-sampling or may be a re-sampled projection face), a front face "Front" (which is a main view that may be a projection face without re-sampling or may be a re-sampled projection face), a back face "Back" (which may be a projection face without re-sampling or may be a re-sampled projection face), a left face "L" (which may be a projection face without re-sampling or may be a re-sampled projection face) and a right face "R" (which may be a projection face without re-sampling or may be a re-sampled projection face) in the truncated square pyramid projection layout 2710.

Figure 28:
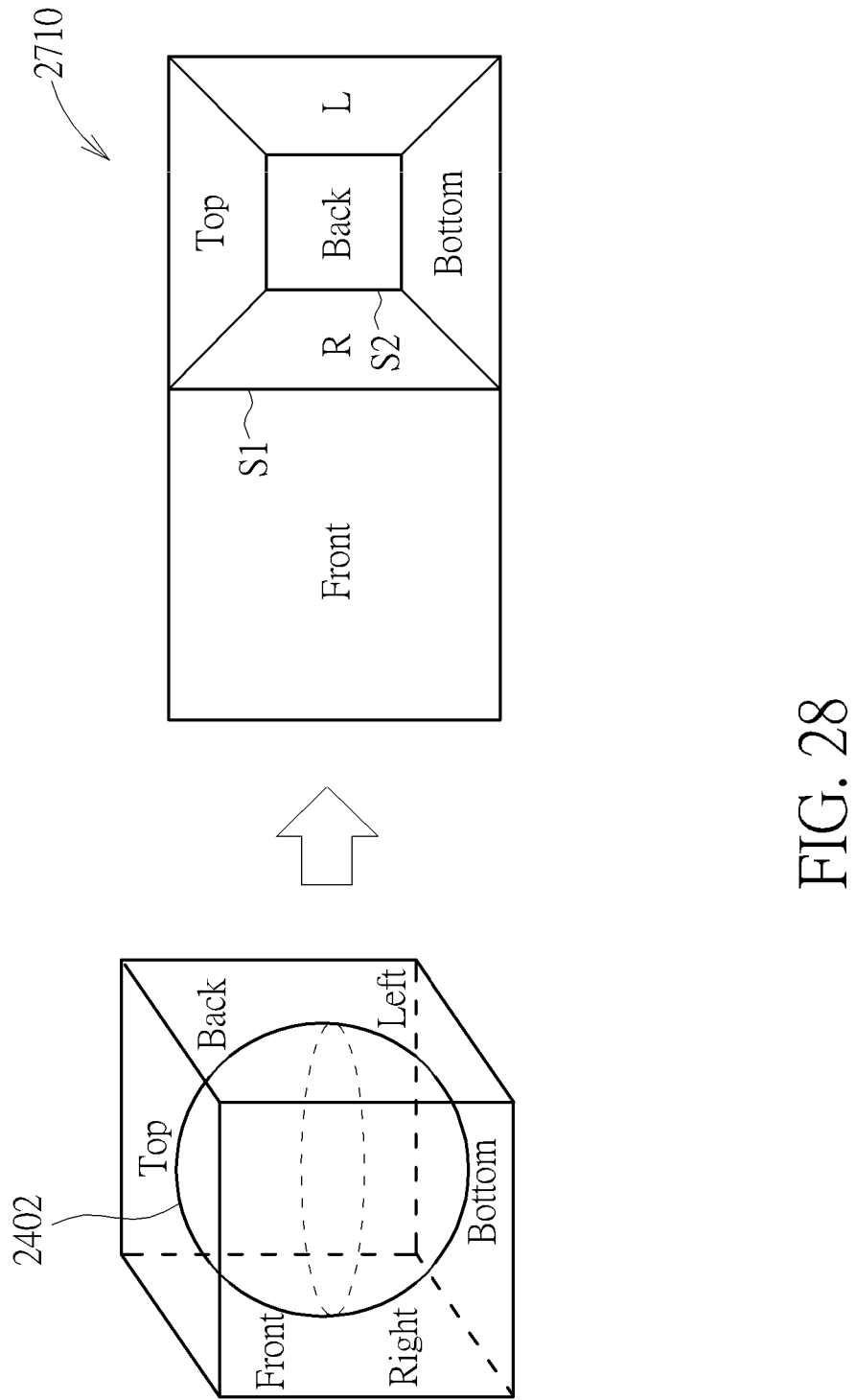
FIG. 28 is a diagram illustrating another non-uniform mapping for truncated square pyramid projection according to an embodiment of the present invention.

FIG. 28 is a diagram illustrating another non-uniform mapping for truncated square pyramid projection (TSP) according to an embodiment of the present invention. The omnidirectional image/video content of the sphere 2402 is mapped/projected onto six square projection faces, including a top face (labeled by "Top"), a bottom face (labeled by "Bottom"), a front face (labeled by "Front"), a back face (labeled by "Back"), a left face (labeled by "Left") and a right face (labeled by "Right"), via a cubemap projection. After square projection faces of a cube are obtained by the projection circuit 132, the re-sampling circuit 134 may apply non-uniform mapping to some or all of the square projection faces. For example, each of the top face, left face, bottom face and right face (which are square projection faces) is re-sampled to another shape (e.g., the shape of a trapezoid) by non-uniform mapping, and the back face (which is a square projection face) is down-scaled by non-uniform mapping without shape type change. In some embodiments of the present invention, the square projection faces may be re-sampled using different non-uniform mapping directions, respectively.

The sampling rate (sampling density) is higher when sampling points in a projection face (e.g., one of top face, left face, bottom face and right face) are closer to the front face or main view. Taking the re-sampled right face (which is a trapezoidal projection face) for example, pixels close to the edge S1 are determined by re-sampling a first region of the original right face (which is a square projection face) with a higher sampling rate (sampling density), and pixels close to the edge S2 are determined by re-sampling a second region of the original right face (which is a square projection face) with a lower sampling rate (sampling density). However, this is not meant to be a limitation of the present invention. Alternatively, re-sampling of the CMP face may include uniform mapping, non-uniform mapping, or a combination of uniform mapping and non-uniform mapping.

The packing circuit 136 packs a top face "Top" (which is a re-sampled projection face), a bottom face "Bottom" (which is a re-sampled projection face), a front face "Front" (which is a main view that may be a projection face without re-sampling or may be a re-sampled projection face), a back face "Back" (which may be a projection face without re-sampling or may be a re-sampled projection face), a left face "L" (which is a re-sampled projection face) and a right face "R" (which is a re-sampled projection face) in the truncated square pyramid projection layout 2710.

Figure 29:
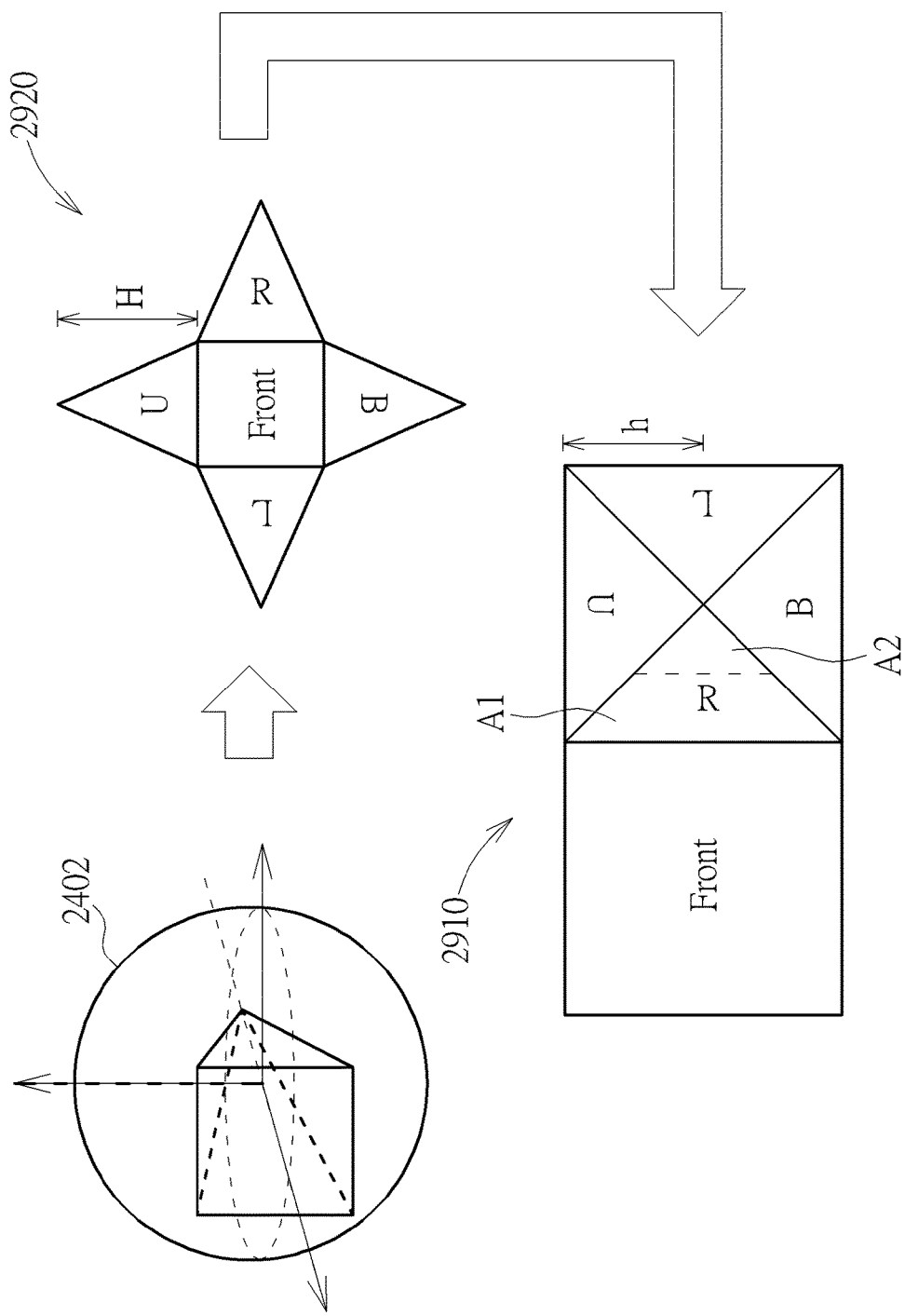
FIG. 29 is a diagram illustrating non-uniform mapping for pyramid projection according to an embodiment of the present invention.

FIG. 29 is a diagram illustrating non-uniform mapping for pyramid projection according to an embodiment of the present invention. The omnidirectional image/video content of the sphere 2402 is mapped/projected onto one square projection face (i.e., a front face labeled by "Front") and four triangular projection faces (i.e., an upper face labeled by "U", a left face labeled by "L", a bottom face labeled by "B", and a right face labeled by "R") via a pyramid projection. In this example, each of the triangular projection faces obtained by pyramid projection has the shape of an isosceles triangle. The projection-based frame IMG to be encoded is required to be rectangular. If the projection layout L_VR is set by the unfolded pyramid layout 2920, dummy areas (e.g., black areas, gray areas, or white areas) are required to be filled in the projection-based frame IMG. To address this issue, the present invention proposes a compact pyramid layout 2910.

After one square projection face (i.e., front face) and four triangular projection faces (i.e., upper face, left face, bottom face, and right face) are obtained by the projection circuit 132 via the pyramid projection of the omnidirectional image/video content on the sphere 2402, the re-sampling circuit 134 may apply non-uniform mapping to some or all of the square projection face (i.e., front face) and the triangular projection faces (i.e., upper face, left face, bottom face, and right face). For example, each of the triangular projection faces (i.e., upper face, left face, bottom face, and right face) is re-sampled to another shape (e.g., the shape of an isosceles right triangle). Specifically, the isosceles-triangle-shaped projection faces with height H are down-sampled to the isosceles-right-triangle-shaped projection faces with height h, respectively.

The sampling rate (sampling density) is higher when sampling points in a projection face (e.g., one of the triangular projection faces) are closer to the front face or main view. Taking the re-sampled right face (which has the shape of an isosceles right triangle) for example, pixels of a first re-sampled region A1 are determined by re-sampling a first source region of the original right face (which has the shape of an isosceles right triangle) with a higher sampling rate (sampling density), and pixels of a second re-sampled region A2 are determined by re-sampling a second source region of the original right face (which has the shape of an isosceles triangle) with a lower sampling rate (sampling density). However, this is not meant to be a limitation of the present invention. Alternatively, re-sampling of the pyramid projection face may include uniform mapping, non-uniform mapping, or a combination of uniform mapping and non-uniform mapping.

The packing circuit 136 packs an upper face "U" (which is a re-sampled projection face), a bottom face "B" (which is a re-sampled projection face), a front face "Front" (which is a main view that may be a projection face without re-sampling or may be a re-sampled projection face), a left face "L" (which is a re-sampled projection face) and a right face "R" (which is a re-sampled projection face) in the compact pyramid projection layout 2910. Since the compact pyramid projection layout 2910 has the shape of a rectangle, the projection-based frame IMG with the compact pyramid layout 2910 is not required to have dummy areas (e.g., black areas, gray areas, or white areas) filled therein.

It should be noted that projection faces obtained via a 360 VR projection may be re-sampled using different mapping functions, respectively. For example, the re-sampling circuit 134 at the encoder side (i.e., source electronic device 102) obtains a first re-sampled projection face by re-sampling at least a portion (i.e., part or all) of a first projection face through non-uniform mapping, and obtains a second re-sampled projection face by re-sampling at least a portion (i.e., part or all) of a second projection face through non-uniform mapping (or uniform mapping), where a mapping function employed for re-sampling the first projection face generated from the projection circuit 132 is different from a mapping function employed for re-sampling the second projection face generated from the projection circuit 132.

Similarly, projection faces obtained from a decoded projection-based frame may be re-sampled using different inverse mapping functions, respectively. For example, the re-sampling circuit 144 at the decoder side (i.e., destination electronic device 104) obtains a first re-sampled projection face by re-sampling at least a portion (i.e., part or all) of a first projection face through inverse non-uniform mapping, and obtains a second re-sampled projection face by re-sampling at least a portion (i.e., part or all) of a second projection face through inverse non-uniform mapping (or inverse uniform mapping), where an inverse mapping function employed for re-sampling the first projection face obtained from the unpacking circuit 142 is different from an inverse mapping function employed for re-sampling the second projection face obtained from the unpacking circuit 142.

Further, different mapping functions may be combined for re-sampling a projection face obtained via a 360 VR projection. For example, the re-sampling circuit 134 at the encoder side (i.e., source electronic device 102) obtains a first part of a re-sampled projection face by re-sampling a first part of a projection face through non-uniform mapping, and obtains a second part of the re-sampled projection face by re-sampling a second part of the same projection face through non-uniform mapping (or uniform mapping), where a mapping function employed for re-sampling the first part of the projection face generated from the projection circuit 132 is different from a mapping function employed for re-sampling the second part of the projection face generated from the projection circuit 132.

Similarly, different inverse mapping functions may be combined for re-sampling a projection face obtained from the decoded projection-based frame IMG'. For example, the re-sampling circuit 144 at the decoder side (i.e., destination electronic device 104) obtains a first part of a re-sampled projection face by re-sampling a first part of a projection face through inverse non-uniform mapping, and obtains a second part of the re-sampled projection face by re-sampling a second part of the same projection face through inverse non-uniform mapping (or inverse uniform mapping), where a mapping function employed for re-sampling the first part of the projection face obtained by the unpacking circuit 142 is different from a mapping function employed for re-sampling the second part of the projection face obtained by the unpacking circuit 142.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A video processing method comprising:
obtaining at least one projection face from an omnidirectional content of a sphere, wherein the omnidirectional content of the sphere is mapped onto said at least one projection face via a 360-degree Virtual Reality (360 VR) projection, and said at least one projection face comprises a first projection face;
obtaining, by a re-sampling circuit, a first re-sampled projection face by re-sampling at least a portion of the first projection face through non-uniform mapping, wherein the first projection face has a first source region and a second source region, the first re-sampled projection face has a first re-sampled region and a second re-sampled region, the first re-sampled region is derived from re-sampling the first source region with a first sampling density, and the second re-sampled region is derived from re-sampling the second source region with a second sampling density that is different from the first sampling density;
generating a projection-based frame according to a projection layout of the 360 VR projection, wherein the projection-based frame comprises the first re-sampled projection face packed in the projection layout; and
encoding the projection-based frame to generate a part of a bitstream.

2. The video processing method of claim 1, wherein the first projection face and the first re-sampled projection face have a same shape type.

3. The video processing method of claim 2, wherein the first projection face and the first re-sampled projection face have a same size.

4. The video processing method of claim 2, wherein the first projection face and the first re-sampled projection face have different sizes.

5. The video processing method of claim 1, wherein the first projection face and the first re-sampled projection face have different shape types.

6. The video processing method of claim 1, wherein said at least one projection face further comprises a second projection face, the video processing method further comprises:
obtaining a second re-sampled projection face by re-sampling at least a portion of the second projection face, wherein the projection-based frame further comprises the second re-sampled projection face packed in the projection layout; and
a mapping function employed for re-sampling said at least a portion of the first projection face is different from a mapping function employed for re-sampling said at least a portion of the second projection face.

7. The video processing method of claim 1, wherein the first re-sampled projection face comprises a first part obtained by re-sampling a first part of the first projection face through the non-uniform mapping and a second part obtained by re-sampling a second part of the first projection face, and a mapping function employed for re-sampling the first part of the first projection face is different from a mapping function employed for re-sampling the second part of the first projection face.

8. The video processing method of claim 1, wherein the non-uniform mapping is performed along only a single mapping direction.

9. The video processing method of claim 1, wherein the non-uniform mapping is performed along different mapping directions.

10. The video processing method of claim 1, wherein the projection layout is a viewport-based cube projection layout, a truncated squared pyramid projection (TSP) layout, or a compact pyramid layout.

11. A video processing method comprising:
receiving a part of a bitstream;
decoding the part of the bitstream to generate a projection-based frame, wherein the projection-based frame has a 360-degree content represented by at least one projection face packed in a projection layout of a 360-degree Virtual Reality (360 VR) projection, and said at least one projection face comprises a first projection face with at least a portion created by encoder-side non-uniform mapping; and
obtaining, by a re-sampling circuit, a first re-sampled projection face by re-sampling said at least a portion of the first projection face through an inverse of the encoder-side non-uniform mapping, wherein the first projection face has a first source region and a second source region, the first re-sampled projection face has a first re-sampled region and a second re-sampled region, the first re-sampled region is derived from re-sampling the first source region with a first sampling density, and the second re-sampled region is derived from re-sampling the second source region with a second sampling density that is different from the first sampling density.

12. The video processing method of claim 11, wherein the first projection face and the first re-sampled projection face have a same shape type.

13. The video processing method of claim 12, wherein the first projection face and the first re-sampled projection face have a same size.

14. The video processing method of claim 12, wherein the first projection face and the first re-sampled projection face have different sizes.

15. The video processing method of claim 11, wherein the first projection face and the first re-sampled projection face have different shape types.

16. The video processing method of claim 11, wherein said at least one projection face further comprises a second projection face with at least a portion created by encoder-side re-sampling, the video processing method further comprises:
obtaining a second re-sampled projection face by re-sampling said at least a portion of the second projection face; and
an inverse mapping function employed for re-sampling said at least a portion of the first projection face is different from an inverse mapping function employed for re-sampling said at least a portion of the second projection face.

17. The video processing method of claim 11, wherein the first re-sampled projection face comprises a first part obtained by re-sampling a first part of the first projection face through the inverse of the encoder-side non-uniform mapping and a second part obtained by re-sampling a second part of the first projection face, and an inverse mapping function employed for re-sampling the first part of the first projection face is different from an inverse mapping function employed for re-sampling the second part of the first projection face.

18. The video processing method of claim 11, wherein the inverse of the encoder-side non-uniform mapping is performed along only a single mapping direction.

19. The video processing method of claim 11, wherein the inverse of the encoder-side non-uniform mapping is performed along different mapping directions.

20. The video processing method of claim 11, wherein the projection layout is a viewport-based cube projection layout, a truncated squared pyramid projection (TSP) layout, or a compact pyramid layout.

21. A video processing apparatus comprising:
a projection circuit, arranged to obtain at least one projection face from an omnidirectional content of a sphere, wherein the omnidirectional content of the sphere is mapped onto said at least one projection face via a 360-degree Virtual Reality (360 VR) projection, and said at least one projection face comprises a first projection face;
a re-sampling circuit, arranged to obtain a first re-sampled projection face by re-sampling at least a portion of the first projection face through non-uniform mapping, wherein the first projection face has a first source region and a second source region, the first re-sampled projection face has a first re-sampled region and a second re-sampled region, the first re-sampled region is derived from re-sampling the first source region with a first sampling density, and the second re-sampled region is derived from re-sampling the second source region with a second sampling density that is different from the first sampling density;
a packing circuit, arranged to generate a projection-based frame according to a projection layout of the 360 VR projection, wherein the projection-based frame comprises the first re-sampled projection face packed in the projection layout; and
a video encoder, arranged to encode the projection-based frame to generate a part of a bitstream.

22. A video processing apparatus comprising:
a video decoder, arranged to receive a part of a bitstream, and decode the part of the bitstream to generate a projection-based frame, wherein the projection-based frame has a 360-degree content represented by at least one projection face packed in a projection layout of a 360-degree Virtual Reality (360 VR) projection, and said at least one projection face comprises a first projection face with at least a portion created by encoder-side non-uniform mapping;
an unpacking circuit, arranged to obtain the first projection face from the projection-based frame according to the projection layout; and
a re-sampling circuit, arranged to obtain a first re-sampled projection face by re-sampling said at least a portion of the first projection face through an inverse of the encoder-side non-uniform mapping, wherein the first projection face has a first source region and a second source region, the first re-sampled projection face has a first re-sampled region and a second re-sampled region, the first re-sampled region is derived from re-sampling the first source region with a first sampling density, and the second re-sampled region is derived from re-sampling the second source region with a second sampling density that is different from the first sampling density.

* * * * *